Sept. 24, 1963                A. R. CONVISER              3,104,458
              APPARATUS AND METHOD FOR POSITIONING, ARRANGING
                           AND COUPLING COMPONENTS
Filed Dec. 5, 1960                                   7 Sheets-Sheet 1

INVENTOR.
Arthur R. Conviser
BY Daniel Jay Tick
     Attorney

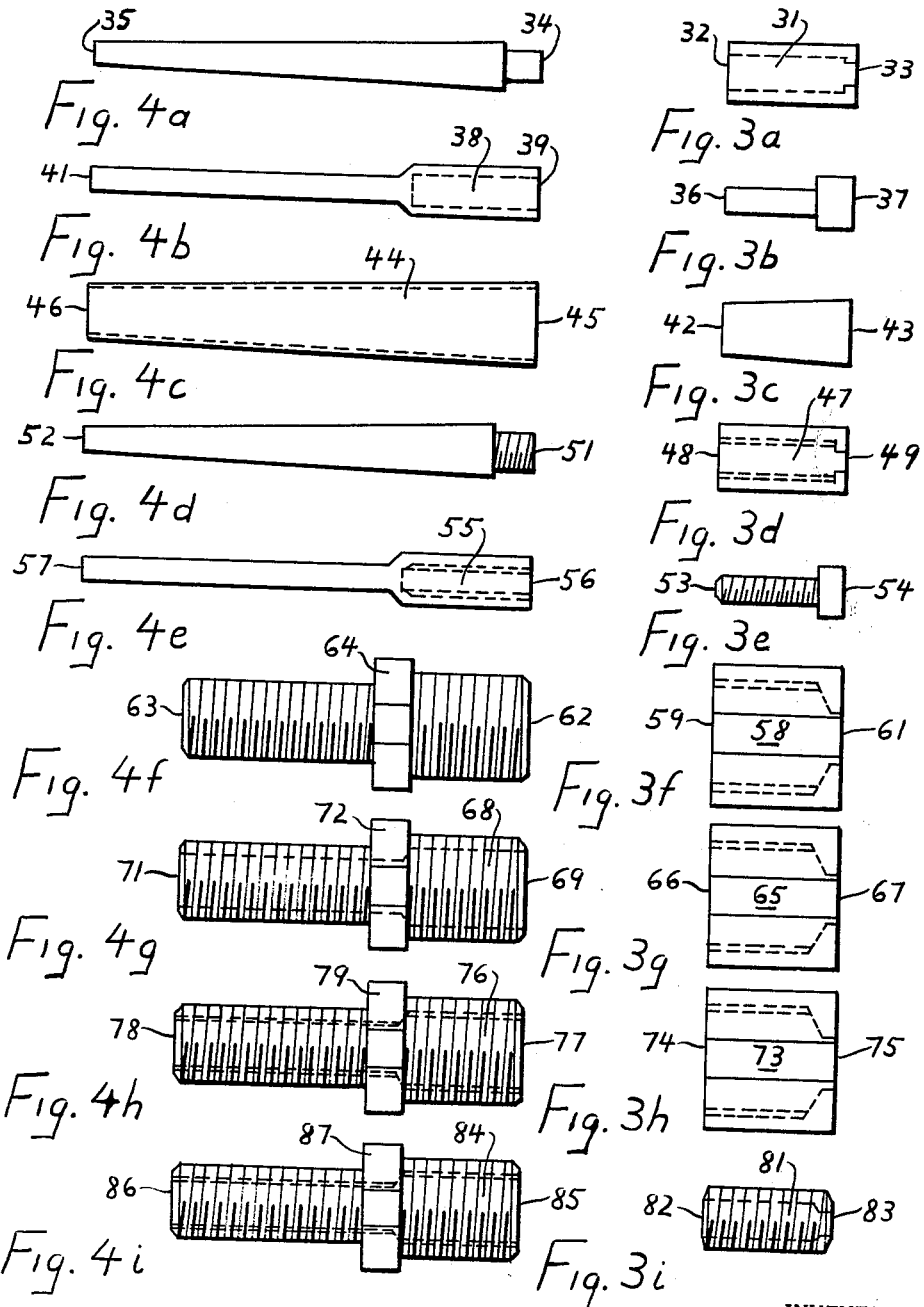

Sept. 24, 1963 A. R. CONVISER 3,104,458
APPARATUS AND METHOD FOR POSITIONING, ARRANGING
AND COUPLING COMPONENTS
Filed Dec. 5, 1960 7 Sheets-Sheet 3

INVENTOR.
Arthur R. Conviser
BY Daniel Jay Tick
Attorney

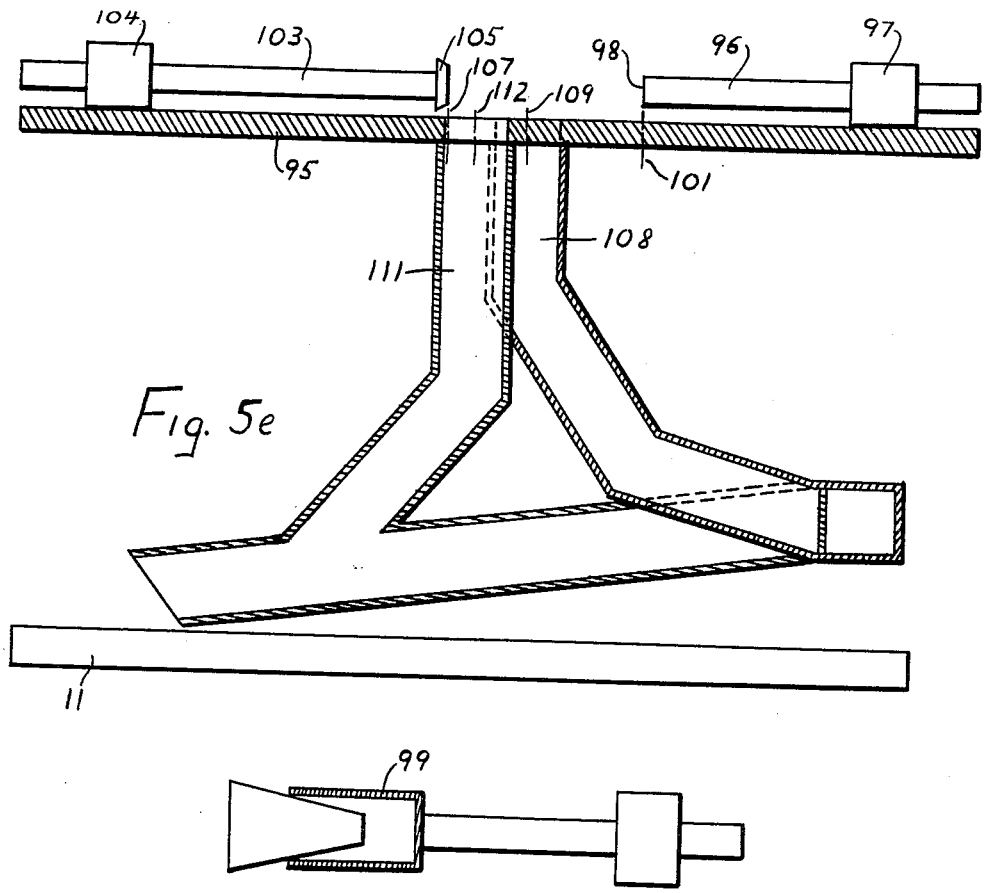
Fig. 5e
Fig. 6
Fig. 9
INVENTOR.
Arthur R. Conviser
BY Daniel Jay Tick
Attorney INVENTOR.
Arthur R. Conviser
BY Daniel Jay Tick
Attorney 3,104,458
APPARATUS AND METHOD FOR POSITIONING, ARRANGING AND COUPLING COMPONENTS
Arthur R. Conviser, Brooklyn, N.Y., assignor to Creative Research Corporation, a corporation of New York
Filed Dec. 5, 1960, Ser. No. 73,822
27 Claims. (Cl. 29—208)

The present invention relates to automatic coupling apparatus. More particularly, the invention relates to coupling apparatus for automatically coupling a first coupling component with a second coupling component and still more particularly for coupling an elongated coupling component which is solid or which has an axial aperture therethrough or which is internally and/or externally threaded with a coupling component which is solid or which has an axial aperture therethrough or which is internally and/or externally threaded.

The principal object of the present invention is to provide automatic coupling apparatus for automatically coupling first and second coupling components.

An object of the present invention is to provide automatic coupling apparatus for automatically coupling first and second coupling components with great facility.

An object of the present invention is to provide automatic coupling apparatus for automatically coupling first and second coupling components with safety.

An object of the present invention is to provide automatic coupling apparatus which is safe, reliable and efficient in operation for automatically coupling first and second coupling components.

An object of the present invention is to provide automatic coupling apparatus for automatically coupling first and second coupling components with great rapidity.

An object of the present invention is to provide automatic coupling apparatus of simple structure for automatically coupling first and second components.

An object of the present invention is to provide automatic coupling apparatus which is readily adjustable for different sizes of components for automatically coupling first and second components.

An object of the present invention is to provide automatic coupling apparatus which is economical to manufacture and operate for automatically coupling first and second components.

An object of the present invention is to provide automatic positioning apparatus for automatically positioning a coupling component.

An object of the present invention is to provide automatic clamping apparatus for automatically clamping and coupling a coupling component.

An object of the present invention is to provide a process for automatically coupling first and second coupling components.

Another object of the present invention is to provide a process for automatically positioning a coupling component.

Still another object of the present invention is to provide a process for automatically coupling a coupling component.

In accordance with the present invention, a preferred embodiment of automatic coupling apparatus for coupling a first coupling component to a second component comprises first automatic positioning means for positioning a first coupling component in a predetermined location. Second automatic positioning means positions a second coupling component in coupling contact with the first coupling component and clamping means automatically couples the first and second coupling components.

In an embodiment of the invention, the first automatic positioning means for positioning a first coupling component on a planar base portion with one of its ends parallel to and supported by the planar base portion, comprises first supporting means positioned above the planar base portion. A first rod has an axis and a first engaging end portion having cross-sectional dimensions adapted to cause the first engaging end portion to abut the first coupling component when the first engaging end portion is urged toward one of the first and second ends of the first coupling component and adapted to cause the first engaging end portion to carry the first coupling component when the engaging end portion is urged toward the other of the first and second ends of the first coupling component. First mounting means slidably supports the first rod on the first supporting means, the first rod being axially movable in the first mounting means from a first position to a maximum extended second position spaced from the first position. A second rod has an axis and a second engaging end portion having cross-sectional dimensions adapted to cause the second engaging end portion to abut the first coupling component when the second engaging end portion is urged toward each of the first and second ends of the first coupling component. Second mounting means slidably supports the second rod coaxially with the first rod on the first supporting means, the second rod being axially movable in the second mounting means from a maximum extended first position between the first position of the first rod and the second mounting means to a second position spaced from the first position between the second position of the first rod and the second mounting means. First supply means supplies the first coupling component in substantially coaxial relation with the first and second rods in a first area in the path of movement of the first rod and adjacent the engaging end portion of each of the first and second rods when the first and second rods are in their first position. First guide means extending from substantial proximity to the planar base portion opens into near proximity with the path of movement of the first and second rods at a first distance from the engaging end portion of the first rod and the engaging end portion of the second rod in its second position. Second guide means extending from substantial proximity to the planar base portion opens into near proximity with the path of movement of the first and second rods at a second distance from the engaging end portions of the first and second rods between the engaging end portion of the second rod in its second position and the opening of the first guide means. First moving means moves the first and second rods in their axial direction from the first position to the second position and back to the first position so that a first coupling component positioned in the first area of the first supporting means with one of its first and second ends adjacent the engaging end portion of the first rod and the other of its first and second ends adjacent the engaging end portion of the second rod is carried by the first rod and is abutted by the second rod in the axial direction thereof into the opening of the first guide means when the first rod is in its second position and the second rod is in an intermediate position and a first coupling component positioned in the first area of the first supporting means with the other of its first and second ends adjacent the engaging end portion of the first rod and the one of its first and second ends adjacent the engaging end portion of the second rod is pushed by the first rod and is abutted by the second rod in the axial direction thereof into the opening of the second guide means when the first and second rods are in their second position, one of the first and second guide means being formed to convey the first coupling component to the planar base portion with the one of the first and second ends thereof parallel to and supported by the planar base portion and the other of the first and second guide means being formed to convey the first coupling component to the planar base portion with the one of the first and second ends thereof parallel to and supported by the planar base portion.

In an embodiment of the invention, the second automatic positioning means for positioning a second coupling component on the other of the first and second ends of the first coupling component on the planar base portion with one of the first and second ends of the second coupling component in coupling contact with the other of the first and second ends of the first coupling component, comprises second supporting means positioned above the planar base portion. A third rod has an axis and a third engaging end portion having cross-sectional dimensions adapted to cause the third engaging end portion to abut the second coupling component when the third engaging end portion is urged toward one of the first and second ends of the second coupling component and adapted to cause the third engaging end portion to carry the second coupling component when the third engaging end portion is urged toward the other of the first and second ends of the second coupling component. Third mounting means slidably supports the third rod on the second supporting means, the third rod being axially movable in the third mounting means from a first position to a maximum extended second position spaced from the first position. Second supply means supplies the second coupling component to the second supporting means in substantially coaxial relation with the third rod in a first area in the path of movement of the third rod and adjacent the third engaging end portion of the third rod when the third rod is in its first position. Third guide means extending from substantial proximity to the first coupling component on the planar base portion opens into the second supporting means in the path of movement of the third rod at a first distance from the engaging end portion of the third rod beyond the first area of the second supporting means. Fourth guide means extending from substantial proximity to the first coupling component on the planar base portion opens into the second supporting means in the path of movement of the third rod at a second distance from the engaging end of the third rod beyond the first distance. Catch means is provided on the second supporting means at the edge of the opening of the fourth guide means farthest from the engaging end portion of the third rod. Second moving means moves the third rod in its axial direction from its first position to its maximum extended second position so that a second coupling component positioned in the first area of the second supporting means with one of its first and second ends adjacent the engaging end portion of the third rod and the other of its first and second ends spaced therefrom is pushed by the third rod in the axial direction thereof the other end first into the opening of the third guide means and a second coupling component positioned in the first area of the second supporting means with the other of its first and second ends adjacent the engaging end portion of the third rod and the one end spaced therefrom is carried by the third rod in the axial direction thereof to the opening of the fourth guide means and when the third rod reaches its maximum extended second position the one end of the second coupling component is engaged by the catch means and the second coupling component drops the other end first into the fourth guide means when the third rod is moved back to its first position.

In an embodiment of the invention, the automatic clamping means for coupling a coupling component comprises a substantially vertically positioned shaft having an axis, an upper region and a lower region, and is rotated about its axis. Support means positioned transversely of the shaft is supported by the shaft in the lower region thereof. A pair of clamping means each having a clamping end and a free opposite end is provided and each is pivotally mounted at a point between its ends at each extremity of the support means, so that when the shaft is rotated the support means rotates therewith and the clamping means are pivoted by centrifugal force with their clamping ends spaced a first distance from each other and with their ends spaced a second distance smaller than the first distance from each other. Control means permits the clamping means to remain pivoted with their clamping ends spaced the first distance from each other and with their free ends spaced the second distance from each other and after a predetermined period of time urges the free ends of the clamping means away from each other to a third distance greater than each of the first and second distances so that the clamping ends of the clamping means are urged toward each other to a fourth distance from each other smaller than each of the first, second and third distances thereby positioning the clamping means to enable the clamping means to clamp a coupling component between the clamping ends thereof and to rotate and drive the coupling component.

A preferred embodiment of the process of the invention for coupling a first coupling component to a second coupling component, comprises the steps of automatically positioning a first coupling component in a predetermined location, automatically positioning a second coupling component in coupling contact with the first coupling component, and automatically coupling the first and second components.

A preferred embodiment of the process of the invention for automatically positioning a coupling component having a first end having first cross-sectional dimensions and a second end opposite to the first end having second cross-sectional dimensions smaller than the first cross-sectional dimensions in a predetermined location with one of the first and second ends thereof parallel to and supported in the predetermined location, comprising the steps of abutting both the first and second ends of the coupling component when one of the first and second ends thereof is at a first point, carrying the coupling component at the other of the first and second ends thereof when the other of said first and second ends thereof is at the first point, carrying the coupling component to a first position, pushing the coupling component to a second position, guiding a coupling component from the first position to the predetermined location with the one of the first and second ends thereof parallel to and supported in the predetermined location, and guiding a coupling component from the second position to the predetermined location with the one of the first and second ends thereof parallel to and supported in the predetermined location.

A preferred embodiment of the process of the invention for automatically positioning a coupling component having a first end having first cross-sectional dimensions and a second end opposite to the first end having second cross-sectional dimensions smaller than the first cross-sectional dimensions in a predetermined location with one of the first and second ends thereof in the predetermined location and the other of the first and second ends spaced therefrom, comprising the steps of abutting the other of the ends of the coupling component when the other of the first and second ends thereof is at a first point, carrying the coupling component at the one of the first and second ends thereof when the one of the first and second ends thereof is at the first point, pushing the coupling component to a first position, carrying the coupling component to a second position, guiding the coupling component from the first position to the predetermined location with the one of the first and second ends thereof in the predetermined location and the other of the first and second ends thereof spaced therefrom, and guiding the coupling component from the second position to the predetermined location with the one of the first and second ends thereof in the predetermined location and the other of the first and second ends thereof spaced therefrom.

A preferred embodiment of the process of the present invention for automatically coupling a coupling component comprising the steps of positioning a pair of clamping means in spaced relation from each other a first distance apart under the control of centrifugal force, and positioning the pair of clamping means in spaced relation from each other a smaller second distance apart under the control of gravitational force, the clamping means at the second distance from each other being enabled to clamp a coupling component between them and to rotate and drive the coupling component.

In order that the present invention may be readily carried into effect it will now be described with reference to the accompanying drawings, wherein:

FIGS. 3a to 3i are side views of various types of first coupling components which may be coupled by the automatic coupling apparatus of the present invention;

FIGS. 4a to 4i are side views of various types of second coupling components which may be coupled by the automatic coupling apparatus of the present invention;

FIG. 5e is a side view, partly in section, of the embodiment of FIGS. 5a to 5d;

FIG. 6 is a side view, partly in section, of a modification of a part of the embodiment of FIGS. 5a to 5e;

FIG. 9 is an exploded view of a pair of coupled first and second coupling components and a sleeve positioned in the aperture of the first coupling component before the coupling of the said coupling components.

I. The Automatic Coupling Apparatus

Figure 1:
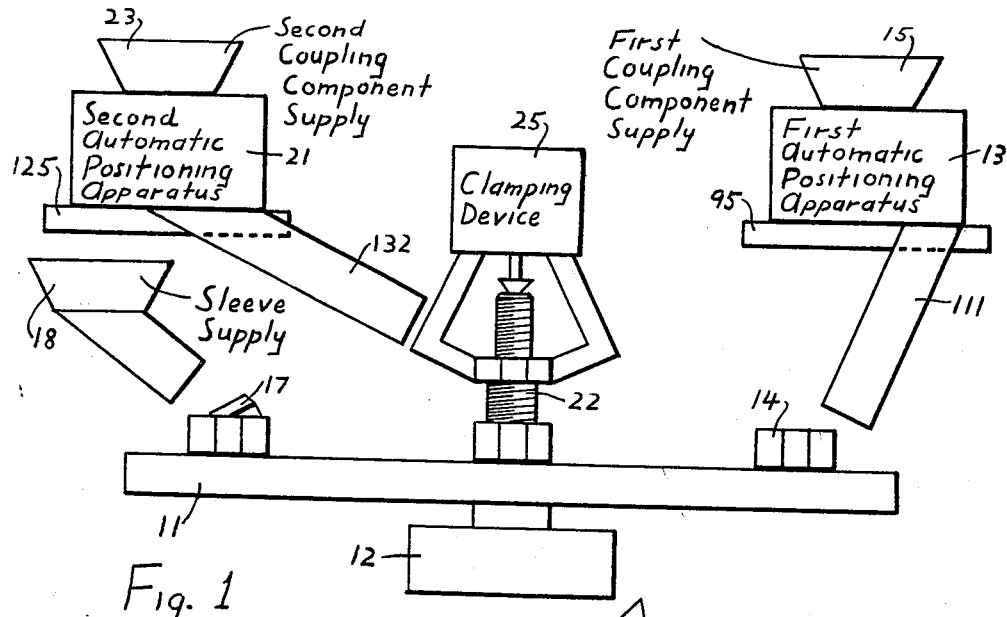
FIG. 1 is a block diagram side view of an embodiment of the automatic coupling apparatus of the present invention.
Figure 2:
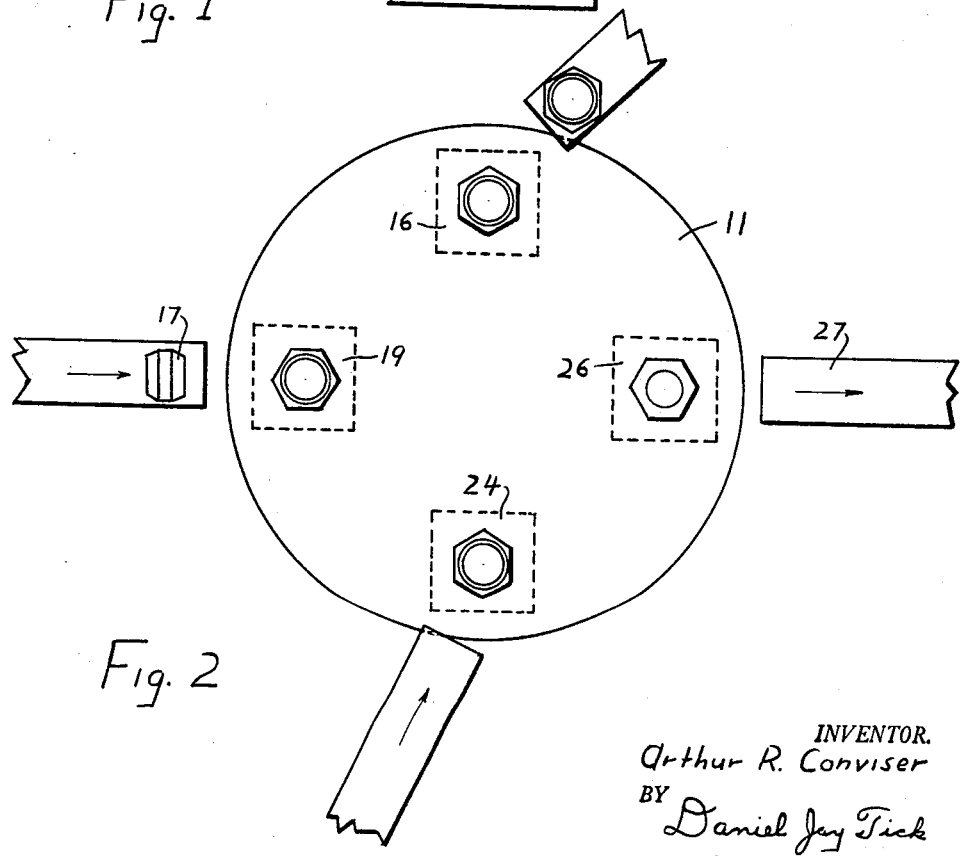
FIG. 2 is a top view of an embodiment of the automatic coupling apparatus of the present invention illustrating the sequence of operation.

In the embodiments of the automatic coupling apparatus of the present invention illustrated by FIGS. 1 and 2, a planar base portion or table 11 is preferably driven by any suitable known type of rotating and positioning device 12, such as, for example, a motor-driven cam controlling the indexing or circumferential positioning of said planar base portion. A suitable rotating and positioning device may comprise, for example, a standard table device commonly known in the art as a "star and cam" or a Geneva table. The planar base portion 11 thus functions as an indexing table which provides for example four working positions to permit a four step cycle of operation of the automatic coupling apparatus of the present invention.

In the first position of the planar base portion 11, first automatic positioning apparatus 13 automatically positions a first coupling component 14 supplied by a first coupling component supply 15 with its second end parallel to and supported by said planar base portion at a first operating area 16. Its first end could of course be positioned on the planar base portion if so desired, by adjustment of the first automatic positioning apparatus 13.

In the second portion of the planar base portion 11, a sleeve 17 is supplied by a sleeve supply 18 to the aperture of the first coupling component 14 at a second operating area 19; the first table area at the first operating area 16 then becoming the second table area at the second operating area 19. While the sleeve 17 is supplied to the first coupling component 14 at the second operating area 19, another coupling component 14 is automatically positioned with its second end parallel to and supported by the planar base portion 11 at the first operating area 16.

In the third position of the planar base portion 11, second automatic positioning apparatus 21 automatically positions a second coupling component 22 supplied by a second coupling component supply 23 on the first end of the first coupling component 14 on said planar base portion with the first end of said second coupling component in coupling contact with said first end of said first coupling component at a third operating area 24; the second table area at the second operating area 19 then becoming the third table area at the third operating area 24. While the second coupling component 22 is supplied to the first coupling component 14 at the third operating area 24, another sleeve 17 is supplied to the other first coupling component 14 at the second operating area 19 and still another first coupling component 14 is automatically positioned with its second end parallel to and supported by the planar base portion 12 at the first operating area 16.

In the third position of the planar base portion 11, a clamping device 25 automatically couples the second coupling component 22 to the first coupling component 14. The sleeve 17 in the aperture of the first coupling component provides a fluid tight coupling connection between fluid connectors, such as, for example, tubes or pipes, connected through the coupled first and second coupling components; one fluid connector being coupled with the second end of the second coupling component, and another fluid connector being coupled with the second end of the first coupling component. The first coupling component 14 may be held in position by any suitable holding means to facilitate the coupling operation.

In the fourth position of the planar base portion 11, the coupled first and second coupling components 14 and 22, with the sleeve 17 in the aperture of the first coupling component, are removed from said planar base portion at a fourth operating area 26; the third table area at the third operating area 24 then becoming the fourth table area at the fourth operating area 26. While the coupled components are removed from the planar base portion 11 at the fourth operating area 26, another second coupling component 22 is automatically positioned on the first end of the other first coupling component 14 with the first end of the other second coupling component in coupling contact with the first end of said other first coupling component at the third operating area 24, still another sleeve 17 is supplied to still another first coupling component 14 at the second operating area 19 and still another first coupling component 14 is automatically positioned with its second end parallel to and supported by the planar base portion 12 at the first operating area 16. Upon further rotary positioning of the planar base portion or table 11, the fourth table area at the fourth operating area 26 then becomes the first table area at the first operating area 16 and the cycle of operation continues.

Although in the illustrated embodiment of the invention the second coupling component 22 is positioned on the first coupling component 14, said coupling components may be positioned in spaced relation on the table 11 and either may be transported by any suitable transport means to the other or both may be transported to a coupling location where they are coupled to each other.

Any suitable removing means may be utilized to remove the coupled first and second coupling components from the planar base portion 11 at the fourth operating area 26. Suitable removing means may comprise, for example, an arm member adapted to sweep the coupled first and second coupling components into a receptacle or into a suitable guide, such as, for example, a trough or channel 27 leading to a receptacle, or the removing means may comprise, for example, a suitable clamping or carrying device adapted to carry said first and second coupled coupling components into such receptacle or guide.

The automatic coupling apparatus of the present invention is able to automatically couple between seven and eight times the number of sets of coupling components coupled by presently known methods and means. Thus, where a manual operation will produce a maximum of 4,000 coupled components per day, the automatic coupling apparatus of the present invention will produce approximately 30,000 sets of coupled components per day.

Other types of components than the first and second coupling components illustrated in FIGS. 1 and 2 may be coupled by the automatic coupling apparatus of the present invention. Any variety of first and second coupling components, such as, for example, those illustrated in FIGS. 3a to 3i and 4a to 4i and described with relation to the first and second automatic positioning apparatus, may be coupled with facility by the automatic coupling apparatus of the present invention. Still other types of coupling components, not illustrated, may be coupled by the automatic coupling apparatus of the present invention.

The coupling component of each of FIGS. 3a to 3i and FIGS. 4a to 4i may be of substantially cylindrical configuration and the aperture therein or therethrough may be of substantially circular cross-sectional area. Alternatively, the coupling component of each of FIGS. 3a to 3i and FIGS. 4a to 4i may be of non-cylindrical configuration. The cross-sectional area of the ends of any of the coupling components may be of any configuration as long as the cross-sectional areas are such as to permit the coupling of corresponding first and second coupling components.

FIG. 3a illustrates a type of coupling component adapted to be positioned by the first automatic positioning apparatus 13. The coupling component of FIG. 3a has an axial aperture 31 formed therethrough. If the coupling component of FIG. 3a has a cylindrical aperture 31 formed therethrough, a first end 32 has cross-sectional dimensions or an inner diameter which is larger than the cross-sectional dimensions or inner diameter of a second end 33 opposite to the first end.

FIG. 4a illustrates a type of coupling component adapted to be positioned by the second automatic positioning apparatus 21 and adapted to couple with the coupling component of FIG. 3a. The coupling component of FIG. 4a is of substantially elongated solid configuration having a first end 34 having cross-sectional dimensions or an outer diameter larger than the cross-sectional dimensions or outer diameter of a second end 35 opposite to the first end. The coupling components of FIGS. 3a and 4a are adapted to be coupled with each other, the cross-sectional dimensions of the first end 34 of the coupling component of FIG. 4a being smaller than the cross-sectional dimensions of the first end 32 of the coupling component of FIG. 3a. The coupling components of FIGS. 3a and 4a may comprise parts of any of a great number of mechanisms and products of manufacture, such as, for example, with an axial aperture through the coupling component of FIG. 4a, ball point or other types of pens and pencils. The coupling components of FIGS. 3a and 4a are adapted to be coupled with each other by the application of slight pressure, the first end 34 sliding into the aperture 31.

FIG. 3b illustrates another type of coupling component adapted to be positioned by the first automatic positioning apparatus 13. The coupling component of FIG. 3b is of solid configuration and has a first end 36 having cross-sectional dimensions or an outer diameter which is smaller than the cross-sectional dimensions or outer diameter of a second end 37 opposite to the first end.

FIG. 4b illustrates a type of coupling component adapted to be positioned by the second automatic positioning apparatus 21 and adapted to couple with the coupling component of FIG. 3b. The coupling component of FIG. 4b is of substantially elongated solid configuration with an axial aperture 38 formed therein and having a first end 39 having cross-sectional dimensions or an inner and outer diameter larger than the cross sectional dimensions or outer diameter of a second end 41 opposite to the first end. The coupling components of FIGS. 3b and 4b are adapted to be coupled with each other, the cross-sectional dimensions of the first end 36 of the coupling component of FIG. 3b being smaller than the cross-sectional dimensions of the first end 39 of the coupling component of FIG. 4b. The coupling components of FIGS. 3b and 4b may comprise parts of any of a great number of mechanisms and products of manufacture and are adapted to be coupled with each other by the application of slight pressure, the first end 36 sliding into the aperture 38.

FIG. 3c illustrates another type of coupling component adapted to be positioned by the first automatic positioning apparatus 13. The coupling component of FIG. 3c is of solid configuration and has a first end 42 having cross-sectional dimensions or an outer diameter which is smaller than the cross-sectional dimensions or outer diameter of a second end 43 opposite to the first end.

FIG. 4c illustrates a type of coupling component adapted to be positioned by the second automatic positioning apparatus 21 and adapted to couple with the coupling component of FIG. 3c. The coupling component of FIG. 4c is of substantially elongated configuration with an axial aperture 44 formed therethrough and having a first end 45 having cross-sectional dimensions or an inner and outer diameter larger than the cross-sectional dimensions or inner and outer diameter of a second end 46 opposite to the first end. The coupling components of FIGS. 3c and 4c are adapted to be coupled with each other, the cross-sectional dimensions of the first end 42 of the coupling component of FIG. 3c being smaller than the cross-sectional dimensions of the first end 45 of the coupling component of FIG. 4c. The coupling components of FIGS. 3c and 4c may comprise parts of any of a great number of mechanisms and products of manufacture and are adapted to be coupled with each other by the application of slight pressure, the first end 42 sliding into the aperture 44.

FIG. 3d illustrates another type of coupling component adapted to be positioned by the first automatic positioning apparatus 13. The coupling component of FIG. 3d has a threaded axial aperture 47 formed therethrough. If the coupling component of FIG. 3d has a cylindrical aperture 47 formed therethrough, a first end 48 has cross-sectional dimensions or an inner diameter which is larger than the cross-sectional dimensions or the inner diameter of a second end 49 opposite to the first end.

FIG. 4d illustrates a type of coupling component adapted to be positioned by the second automatic positioning apparatus 21 and adapted to couple with the coupling component of FIG. 3d. The coupling component of FIG. 4d is of substantially elongated solid configuration having a threaded first end 51 having cross-sectional dimensions or an outer diameter larger than the cross-sectional dimensions or outer diameter of a second end 52 opposite to the first end. The coupling components of FIGS. 3d and 4d are adapted to be coupled with each other, the cross-sectional dimensions of the first end 51 of the coupling component of FIG. 4d being smaller than the cross-sectional dimensions of the first end 48 of the coupling component of FIG. 3d. The coupling components of FIGS. 3d and 4d may comprise parts of any of a great number of mechanisms and products of manufacture and are adapted to be coupled with each other by the threading of the first end 51 into the aperture 47.

FIG. 3e illustrates another type of coupling component adapted to be positioned by the first automatic positioning apparatus 13. The coupling component of FIG. 3e is of solid configuration having an exterior threaded first end 53 having cross-sectional dimensions or an outer diameter which is smaller than the cross-sectional dimensions or outer diameter of a second end 54 opposite to the first end.

FIG. 4e illustrates a type of coupling component adapted to be positioned by the second automatic positioning apparatus 21 and adapted to couple with the coupling component of FIG. 3e. The coupling component of FIG. 4e is of substantially elongated configuration having a threaded axial aperture 55 formed therein and having a first end 56 having cross-sectional dimensions or an inner and outer diameter larger than the cross-sctional dimensions or outer diameter of a second end 57 opposite to the first end. The coupling components of FIGS. 3e and 4e are adapted to be coupled with each other, the cross-sectional dimensions of the first end 53 of the coupling component of FIG. 3e being smaller than the cross-sectional dimensions of the first end 56 of the coupling component of FIG. 4e. The coupling components of FIGS. 3e and 4e may comprise parts of any of a great number of mechanisms and products of manufacture and are adapted to be coupled with each other by the threading of the first end 53 into the aperture 55.

FIG. 3f illustrates another type of coupling component adapted to be positioned by the first automatic positioning apparatus 13. The coupling component of FIG. 3f has a threaded axial aperture 58 formed therethrough and may be cylindrical or of nut-like outer configuration. The coupling component of FIG. 3f has a first end 59 having cross-sectional dimensions or an inner diameter which is larger than the cross-sectional dimensions or the inner diameter of a second end 61 opposite to the first end.

FIG. 4f illustrates a type of coupling component adapted to be positioned by the second automatic positioning apparatus 21 and adapted to couple with the coupling component of FIG. 3f. The coupling component of FIG. 4f is of substantially elongated solid configuration having a threaded first end 62 having cross-sectional dimensions or an outer diameter larger than the cross-sectional dimensions or outer diameter of a threaded second end 63 opposite to the first end. The coupling component of FIG. 4f has an intermediate portion 64 which may be of cylindrical or of nut-like configuration. The coupling components of FIGS. 3f and 4f are adapted to be coupled with each other, the cross-sectional dimensions of the first end 62 of the coupling component of FIG. 4f being smaller than the cross-sectional dimensions of the first end 59 of the coupling component of FIG. 3f. The coupling components of FIGS. 3f and 4f may comprise parts of any of a great number of mechanisms and products of manufacture and are adapted to be coupled with each other by the threading of the first end 62 into the aperture 58.

FIG. 3g illustrates a coupling component identical with the coupling component of FIG. 3f and having a threaded axial aperture 65 formed therethrough and a first end 66 and a second end 67.

FIG. 4g illustrates a type of coupling component adapted to be positioned by the second automatic positioning apparatus 21 and adapted to couple with the coupling component of FIG. 3g. The coupling component of FIG. 4g is of substantially elongated configuration having an axial aperture 68 formed therethrough and having a threaded first end 69 having cross-sectional dimensions or an inner and outer dimension larger than the cross-sectional dimensions or inner and outer diameter of a threaded second end 71 opposite to the first end. The coupling component of FIG. 4g has an intermediate portion 72 which may be cylindrical or of nut-like configuration. The coupling components of FIGS. 3g and 4g are adapted to be coupled with each other, the cross-sectional dimensions of the first end 69 of the coupling component of FIG. 4g being smaller than the cross-sectional dimensions of the first end 66 of the coupling component of FIG. 3g. The coupling components of FIGS. 3g and 4g may comprise parts of any of a great number of mechanisms and products of manufacture and are especially adapted to be used as a fuel or fluid line joint, fluid being fed through the coupled components via fluid lines connected to each of the coupled components. If the coupled components are utilized as a fluid line joint, a sleeve 17, as shown in FIGS. 1 and 2, is placed in the aperture 65 before the coupling components are coupled with each other. The coupling components of FIGS. 3g and 4g are adapted to be coupled with each other by the threading of the first end 69 in the aperture 65.

FIG. 3h illustrates a coupling component identical with the coupling component of FIG. 3f and having a threaded axial aperture 73 formed therethrough and a first end 74 and a second end 75.

FIG. 4h illustrates a type of coupling component adapted to be positioned by the second automatic positioning apparatus 21 and adapted to couple with the coupling component of FIG. 3h. The coupling component of FIG. 4h is of substantially elongated configuration having a threaded axial aperture 76 formed therethrough and having a threaded first end 77 having cross-sectional dimensions or an inner and outer diameter larger than the cross-sectional dimensions or inner and outer diameter of a threaded second end opposite to the first end. The coupling component of FIG. 4h has an intermediate portion 79 which may be cylindrical or of nut-like configuration. The coupling components of FIGS. 3h and 4h are adapted to be coupled with each other, the cross-sectional dimensions of the first end 77 of the coupling component of FIG. 4h being smaller than the cross-sectional dimensions of the first end 74 of the coupling component of FIG. 3h. The coupling components of FIGS. 3h and 4h are adapted for the same uses as are the coupling components of FIGS. 3g and 4g and are adapted to be coupled with each other by the threading of the first end 77 in the aperture 73.

FIG. 3i illustrates another type of coupling component adapted to be positioned by the first automatic positioning apparatus 13. The coupling component of FIG. 3i has an axial aperture 81 formed therethrough and is externally threaded. The coupling component of FIG. 3i has a first end 82 having cross-sectional dimensions or an inner diameter which is larger than the cross-sectional dimensions or the inner diameter of a second end 83 opposite to the first end.

FIG. 4i illustrates a type of coupling component adapted to be positioned by the second automatic positioning apparatus 21 and adapted to couple with the coupling component of FIG. 3i. The coupling component of FIG. 4i is identical with the coupling component of FIG. 4h and has a threaded axial aperture formed therethrough, a first end 85, a second end 86 and an intermediate portion 87. The coupling components of FIGS. 3i and 4i are adapted to be coupled with each other, the cross-sectional dimensions of the first end 82 of the coupling component of FIG. 3i being smaller than the cross-sectional dimensions of the first end 85 of the coupling component of FIG. 4i. The coupling components of FIGS. 3i and 4i are adapted for the same uses as are the coupling components of FIGS. 3g and 4g and are adapted to be coupled with each other by the threading of the first end 82 in the aperture 84.

*II. The First Automatic Positioning Apparatus*

FIGS. 5a to 5e illustrate an embodiment of the first automatic positioning apparatus of the present invention for positioning any coupling component of the types shown in FIGS. 3a to 3i. For illustrative purposes, a nut-like first coupling component 91 of the type illustrated in FIGS. 3f, 3g and 3h is shown as being positioned by the first automatic positioning apparatus in predetermined relation to the planar base portion or table 11 (FIGS. 1 and 2). As defined with relation to FIGS. 3f, 3g and 3h, the first end 92 (identical with 59, 66 or 74) has a first inner diameter and the second end 93 (identical with 61, 67 or 75) has a second inner diameter smaller than the first inner diameter of said first end. The nut-like first coupling component 91 has a threaded axial aperture 94 formed therethrough. The aperture 94 is not labeled in FIGS. 5a to 5d in order to avoid undue complication of the drawing and thereby to preserve the clarity of presentation. The aperture 94 is defined by the pair of dotted lines closest to, and positioned one on each side of, the axis of the first coupling component 91.

The first automatic positioning apparatus is positioned on a first supporting platform 95 shown in FIGS. 1 and 5e, which first supporting platform is positioned above the planar base portion 11. A first rod 96 is mounted on the platform 95 by a suitable first mount 97 such as, for example, a bearing permitting slidable movement of said first rod in its axial direction. The first rod 96 has an engaging end 98 having a diameter larger than the second inner diameter of the second end 93 of the first coupling component 91 and smaller than the first inner diameter of the first end 92 of said first coupling component and adapted to move freely through said first end. Thus, the engaging end 98 of the first rod cannot enter the aperture 94 through the second end 93 but merely abuts said second end when it comes in contact therewith, whereas said engaging end may slide freely into and out of said aperture through the first end 92.

If a coupling component of the type of FIG. 3c were to be positioned by the first automatic positioning apparatus, the engaging end of the first rod may comprise a substantially cylindrical or cup-like configuration such as, for example, the engaging end 99 shown in FIG. 6. The engaging end 99 may of course be utilized with any number of types of coupling components as long as the cross-sectional dimensions or the inner diameter of said engaging end is larger than the cross-sectional dimensions or outer diameter of one end of the coupling component and is smaller than the cross-sectional dimensions or outer diameter of an opposite end of said coupling component. This will be apparent from the description of the operation of the embodiment of FIGS. 5a to 5e.

The first rod 96 is axially movable in the mount 97 from a first position 101 to a maximum extended second position 102 spaced from the first position 101.

A second rod 103 is mounted on the platform 95 by a suitable second mount 104 similar to the mount 97 which permits slidable movement of said second rod in its axial direction. The second rod 103 has an engaging end 105 having a diameter larger than the first and second inner diameters of the first and second ends 92 and 93, respectively, of the first coupling component 91. The second rod 103 is positioned and moved coaxially with the first rod 96. Thus, the engaging end 105 of the second rod 103 cannot enter the aperture 94 through either the first or second end 92 or 93, respectively, but merely abuts the end it comes in contact with. The second rod is axially movable in the mount 104 from a maximum extended first position 106 between the first position 101 of the first rod and the mount 104 to a second position 107 between the second position 102 of the first rod and the mount 104.

The first coupling component supply 15 (shown in FIG. 1), which may comprise any suitable means for supplying a first coupling component 91 in coaxial relationship with the rods 96 and 103, such as, for example, a hopper, supplies a first coupling component 91 in substantially coaxial relation with the first and second rods 96 and 103 in a first area in the path of movement of the first rod and adjacent the engaging end 98 (FIG. 5e) and 105, respectively, of each of said first and second rods when the said first and second rods are in their first position 101 and 106, respectively.

A first guide 108 comprising any suitable guide means such as, for example, a channel, trough, tube or conveyor means, extends from substantial proximity to the planar base portion 11 (FIGS. 1 and 5e) and opens into near proximity with the path of movement of the first and second rods 96 and 103, respectively, at a first distance 109 from the engaging ends 98 and 105, respectively, of said first and second rods between the engaging end 98 of the said first rod in its first position 101 and the engaging end 105 of the said second rod in its second position 107.

A second guide 111, comprising any suitable means such as, for example, a channel, trough, tube or conveyor means, extends from substantial proximity to the planar base portion 11 (FIGS. 1 and 5e) and opens into near proximity with the path of movement of the first and second rods 96 and 103, respectively, at a second distance 112 from the engaging ends 98 and 105, respectively, of said first and second rods between the engaging end 105 of the said second rod in its second position 107 and the opening of the first guide 108.

A prime mover, comprising any suitable moving means such as, for example, a motor and cam arrangement or a separate motor for each or a motor geared or coupled to each of the first and second rods 96 and 103, moves said first and second rods in their axial direction from their first position 101 and 106, respectively, to their second position 102 and 107, respectively, and back to their first position. Of course, suitable spring means may be utilized to return the first and second rods to their first position. The moving means is so coupled to the first and second rods 96 and 103, respectively, that said rods move in corresponding relation with each other. The moving means is not shown in order to preserve the clarity of presentation.

Figure 5A:
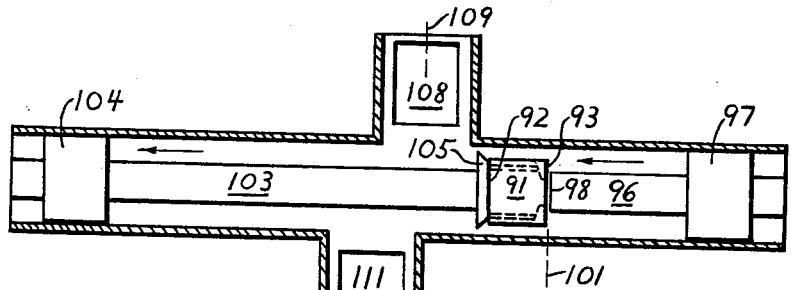
FIGS. 5a to 5d are top views of an embodiment of the first automatic positioning apparatus of the present invention.
Figure 5B:
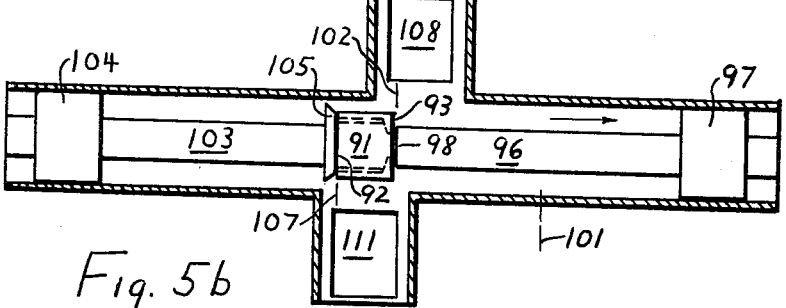

In FIG. 5a, a first coupling component 91 supplied by the first coupling component supply 15 is positioned in the first area of the first supporting platform 95 with its second end 93 adjacent the engaging end 98 of the first rod 96, said first rod being in its first position, and with its first end 92 adjacent the engaging end 105 of the second rod 103, said second rod being in its first position. The moving means then moves the first and second rods 96 and 103, respectively, in the direction of the arrows, and since the first and second ends of the first coupling component 91 are abutted by the engaging ends 105 and 98, respectively, of the second and first rods 103 and 96, respectively, said first coupling component is abutted and pushed by the said first rod and is abutted by the said second rod in the axial direction of the said rods. The first coupling component 91 is thus moved in the axial direction of and with the first and second rods until said first and second rods reach their second positions as illustrated in FIG. 5b. The first rod 96 is then moved by the moving means in the direction of the arrow in FIG. 5b while the second rod 103 remains in its second position for a short period of time sufficient for the first coupling component 91 to be moved into the opening of the second guide 111. The first coupling component 91 may be moved into the second guide by any suitable transporting means such as, for example, an inclined plane, an arm of hanging or side mounted type, conveyor means, or an air blast, coordinated with the movement of the first and second rods to move said first coupling component into said second guide after said first and second rods have reached their second position. After the first coupling component 91 is moved into the second guide 111, the second rod 103 is moved by the moving means back to its first position, the first rod 96 having been previously moved back to its first position.

The first coupling component 91 may be positioned by the first automatic positioning means with its first end up and with its second end resting on the planar base portion 11 if a second coupling component is to be coupled with said first end and with its second end up and with its first end resting on said planar base portion if the second coupling is to be coupled with said second end. In the illustration of FIGS. 5a to 5e, the second coupling component is to be coupled with the first end 92 of the first coupling component 91 so it is necessary, in the embodiment shown, to position said first coupling component on the planar base portion 11 with its first end up and with its second end resting on said planar base portion. The second guide 111 is thus formed (FIG. 5e) to guide the first coupling component 91 to the planar base portion 11 with its first end up and with its second end resting on said planar base portion.

Figure 5C:
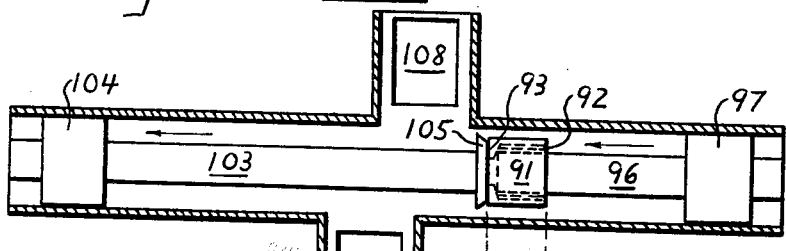
Figure 5D:
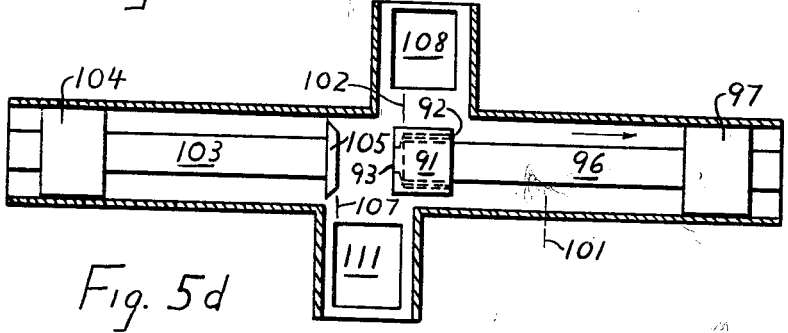

In FIG. 5c, a first coupling component 91 supplied by the first coupling component supply 15 is positioned in the first area of the first supporting platform 95 with its first end 92 adjacent the engaging end 98 of the first rod 96, said first rod being in its first position, and with its second end 93 adjacent the engaging end 105 of the second rod 103, said second rod being in its first position. The moving means then moves the first and second rods 96 and 103, respectively, in the direction of the arrows, and since the cross-sectional dimensions or outer diameter of the engaging end 98 of the first rod 96 are smaller than the cross-sectional dimensions or inner diameter of the first end 92 of the first coupling component 91 said first rod moves into the aperture 94 of said first coupling component and the said first coupling component is seated on and carried by the said first rod, as shown in FIG. 5c. The first coupling component is abutted by the second rod on its second end 93 and is moved in the axial direction of the first and second rods. The first coupling component 91 is thus carried by the first rod and is moved in the axial direction of the first and second rods until said first and second rods reach their second positions, as illustrated in FIG. 5d. The first rod 96 is then loosely carrying the first coupling component 91 and the second rod 103 is free of said first coupling component. The first rod 96 is then moved by the moving means in the direction of the arrow in FIG. 5d while the second rod 103 remains in its second position for a short period of time sufficient for said first rod to move free of the first coupling component 91 and for said first coupling component to be moved into the first guide 108 by any suitable transporting means such as, for example, an inclined plane, an arm of hanging or side mounted type, conveyor means, or an air blast, coordinated with the movement of the first and second rods to move said first coupling component into said first guide after said first rod has moved clear of the said first coupling component. After the first coupling component 91 is moved into the first guide 108, the second rod 103 is moved back to its first position, the first rod 96 having previously moved back to its first position.

In the illustration of FIGS. 5a to 5e, the second coupling component is to be coupled with the first end 92 of the first coupling component 91 so that the first guide 108 is formed (FIG. 5e) to guide the first coupling component 91 to the planar base portion 11 with its first end up and with its second end resting on said planar base portion.

III. The Second Automatic Positioning Apparatus

FIGS. 7a to 7g illustrate an embodiment of the second automatic positioning apparatus of the present invention for positioning any coupling component of the types shown in FIGS. 4a to 4i. For illustrative purposes, an elongated or sleeve-like second coupling component 121 of the type illustrated in FIGS. 4f, 4g, 4h and 4i is shown as being positioned by the second automatic positioning apparatus in predetermined relation to the planar base portion 11 (FIGS. 1 and 2). As defined with relation to FIGS. 4f, 4g, 4h and 4i, the threaded first end 122 (identical with 62, 69, 77 or 85) has a first inner diameter and a first outer diameter and the second threaded end 123 (identical with 63, 71, 78 or 86) has a second inner diameter smaller than the first inner diameter of the first end and a second outer diameter smaller than the first outer diameter of the first end. The elongated or sleeve-like cylindrical second coupling component 121 has a threaded axial aperture 124 formed therethrough. The aperture 124 is not labeled in FIGS. 7a to 7g in order to avoid undue complication of the drawing and thereby to preserve the clarity of presentation. The aperture 124 is defined by the pair of dotted lines closest to, and positioned one on each side of, the axis of the second coupling component 121.

The second automatic positioning apparatus is positioned on a second supporting platform 125 shown in FIGS. 1 and 7a to 7f, which second supporting platform is positioned above the planar base portion 11. A rod 126 is mounted on the platform 125 by a suitable first mount 127 such as, for example, a bearing permitting slidable movement of said rod in its axial direction. The rod 126 has an engaging end 128 having a diameter larger than the second inner diameter of the second end 123 of the second coupling component 121 and smaller than the first inner diameter of the first end 122 of said second coupling component and adapted to move freely through said first end. Thus, the engaging end 128 of the rod 126 cannot enter the aperture 124 through the second end 123 but merely abuts said second end when it comes in contact with it, whereas said engaging end may slide freely into and out of said aperture through the first end 122. Since the second coupling component 121 is, in the illustration of FIGS. 7a to 7g, to be coupled with the first end 92 of the nut-like first coupling component 91, the outer diameter of the threaded first end 122 of said second coupling component is adapted to threadedly engage and couple with the threaded aperture 94 so that the inner diameter of the first end of said first coupling component is adapted to couple with said first end 122.

If the threaded second end 123 of the second coupling component 121 were to be coupled with the first end 92 of the nut-like first coupling component 91, said second coupling component 121 would have to be positioned with said second end 123 in coupling contact with said first coupling component 91. In such case, which is just the opposite of that illustrated in FIGS. 7a to 7g, a rod having a substantially cylindrical or cup-like configuration such as, for example, the engaging end 99 shown in FIG. 6 may be utilized. In such case, the cross-sectional dimensions or the inner diameter of the engaging end 99 would be larger than the cross-sectional dimensions or outer diameter of the second end 123 of the second coupling member 121 and would be smaller than the outer diameter but larger than the inner diameter of the first end 122 of said second coupling component. This will be apparent from the description of the operation of the embodiment of FIGS. 7a to 7g.

The rod 126 is axially movable in the mount 127 from a first position 129 to a maximum extended second position 131 spaced from the first position 129.

The second coupling component supply 18 (shown in FIG. 1), which may comprise any suitable means for supplying a second coupling component 121 in coaxial relationship with the rod 126 such as, for example, a hopper, supplies a second coupling component 121 in substantially coaxial relation with said rod in a first area in the path of movement of the said rod and adjacent the engaging end 128 of the said rod when the said rod is in its first position 129.

A first guide 132 comprising any suitable guide means such as, for example, a channel, trough, tube or conveyor means, extends from substantial proximity to the planar base portion 11 (FIGS. 1 and 7a) and opens into the supporting platform 125 in the path of movement of the rod 126 at a first distance 133 from the engaging end 128 of said rod in its first position 129 beyond the first area of said supporting platform.

A second guide 134 comprising any suitable guide means such as, for example, a channel, trough, tube or conveyor means, extends from substantial proximity to the planar base portion 11 (FIGS. 1 and 7a) and opens into the supporting platform 125 in the path of movement of the rod 126 at a second distance 135 from the engaging end 128 of said rod in its first position 129 beyond the first distance 133.

A catch 136 which preferably comprises a short plate or strip of resilient material is affixed to and extends from the supporting platform 125 at the edge 137 (FIG. 7g) of the opening of the second guide 134 farthest from the engaging end 128 of the rod 126.

A prime mover comprising any suitable moving means such as, for example, a motor and cam arrangement, or a motor coupled to move the rods 96 and 103 of the first automatic positioning apparatus, moves the rod 126 in its axial direction from its first position 129 to its second position 131 and back to its first position. Of course, suitable spring means may be utilized to return the rod 126 to its first position. The moving means is not shown in order to preserve the clarity of presentation.

Figure 7A:
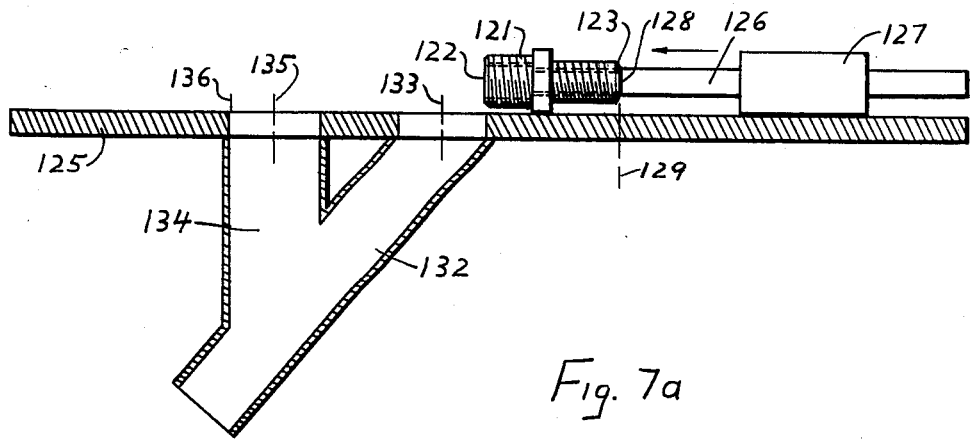
FIGS. 7a to 7f are side views, partly in section, of an embodiment of the second automatic positioning apparatus of the present invention.
Figure 7B:
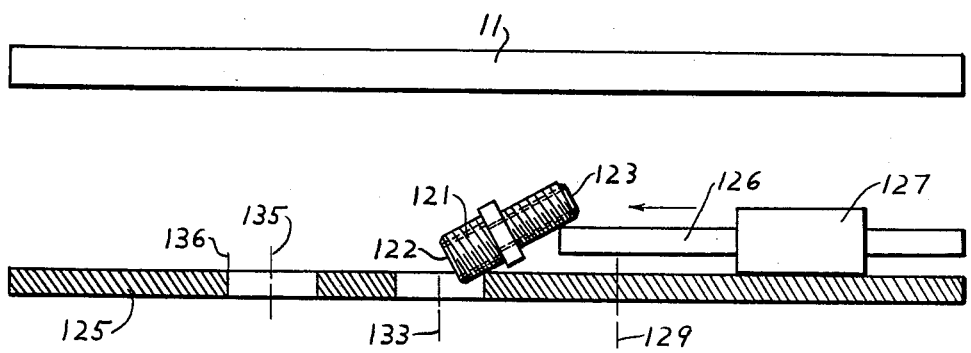

In FIG. 7a, a second coupling component 121 supplied by the second coupling component supply 18 is positioned in the first area of the second supporting platform 125 with its second end 123 adjacent the engaging end 128 of the rod 126 and its first end spaced therefrom, said rod being in its first position. The moving means then moves the rod 126 in the direction of the arrow and since the second end of the second coupling component 121 is abutted by the engaging end 128, said second coupling component is abutted and pushed by said rod in the axial direction thereof. The second coupling component 121 is thus moved in the axial direction of and with the rod 126 until the first end 122 of said second coupling component reaches the opening of the first guide 132, as illustrated in FIG. 7b, whence said first end 122 is pushed into said opening of said first guide.

Figure 7C:
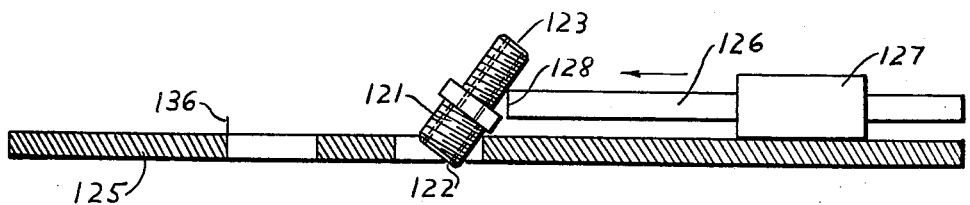

The rod 126 is moved in the same direction as the second coupling component is pushed, first end first, into the first guide 132, as shown in FIG. 7c. The second coupling component 121 may, of course, be pushed into the first guide 132 by any suitable pushing means such as, for example, a push rod, after it has been moved to the opening of said first guide by the rod 126. The second coupling component 121 is conveyed, first end first, to the planar base portion 11 by the first guide 132 and the rod 126 passes over the opening of said first guide and continues to move in the direction of the arrow of FIG. 7c until it reaches its second position 131. After the rod 126 is moved to its second position 131 it is moved by the moving means back to its first position.

In the illustration of FIGS. 7a to 7g, the first end 122 of the second coupling component 121 is to be coupled with the first end 92 of the first coupling component so it is necessary, in the embodiment shown, to position said first end of said second coupling component on said first end of said first coupling component and in coupling contact with the said first coupling component on the planar base portion 11.

Figure 7D:
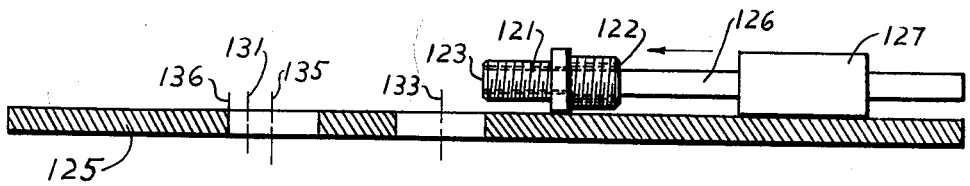
Figure 7E:
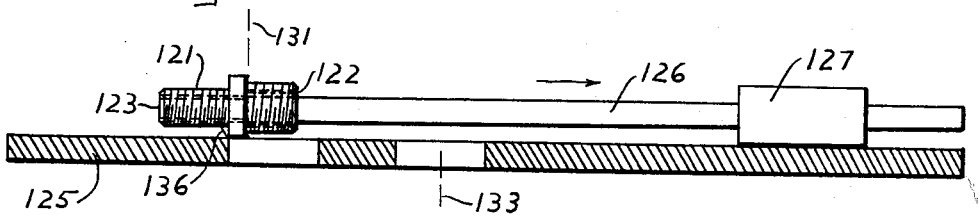
Figure 7F:
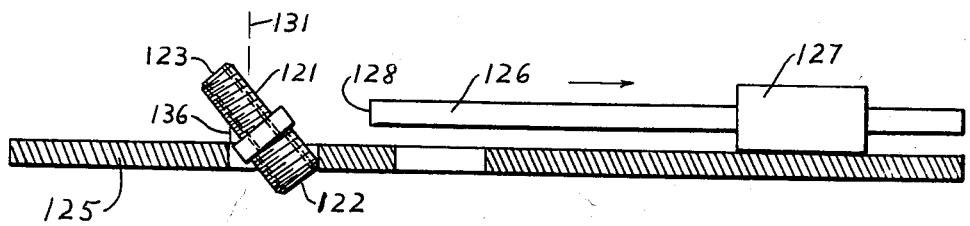
Figure 7G:
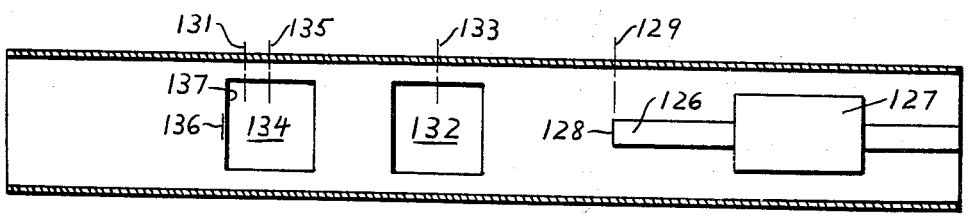
FIG. 7g is a top view of the embodiment of FIGS. 7a to 7f.

In FIG. 7d, a second coupling component 121 supplied by the second coupling component supply 18 is positioned in the first area of the second supporting platform 125 with its first end 122 adjacent the engaging end 128 of the rod 126 and its second end 123 spaced therefrom, said rod being in its first position. The moving means then moves the rod 126 in the direction of the arrow and, since the cross-sectional dimensions or outer diameter of the engaging end 128 of said rod are smaller than the cross-sectional dimensions or inner diameter of the first end 122 of the second coupling component 121, the said rod moves into the aperture 124 of said second coupling component and the said second coupling component is seated on and carried by the said rod, as shown in FIGS. 7d and 7e. The second coupling component is moved in the axial direction of the rod 126. The second coupling component 121 is thus carried by the rod 126 and is moved in the axial direction of said rod until the said rod reaches its second position as illustrated in FIG. 7e. The rod 126 is then loosely carrying the second coupling component 121 and the second end 123 of said second coupling component is engaged by the catch 136 so that the said second coupling component is held by said catch at the second position of said rod. The rod 126 is then moved in the direction of the arrow in FIG. 7e back to its first position and the second coupling component 121 drops into the opening of the second guide 134, first end first, under its own weight as shown in FIG. 7f. The second coupling component may, of course, be pushed into the second guide 134 by any suitable pushing means such as, for example, a push rod, after it has been moved to the opening of said second guide by the rod 126. The second coupling component 121 is conveyed, first end first, to the planar base portion 11 by the second guide 134 and the rod 126 moves in the direction of the arrow in FIG. 7f back to its first position.

In the illustration of FIGS. 7a to 7g, the first and second guides 132 and 134, respectively, are formed to guide the second coupling component 121 to the planar base portion 11 with its first end down and with its second end up. Thus, since the second coupling component 121 is conveyed by each of the first and second guides 132 and 134, respectively, with its first end down, said first and second guides may be joined to provide a common outlet to the planar base portion 11, just as the first and second guides 108 and 111 may be joined, as shown in FIG. 5e, to keep the second end 93 of the first coupling component 91 down and its first end 92 up.

*IV. Automatic Clamping Device*

Figure 8A:
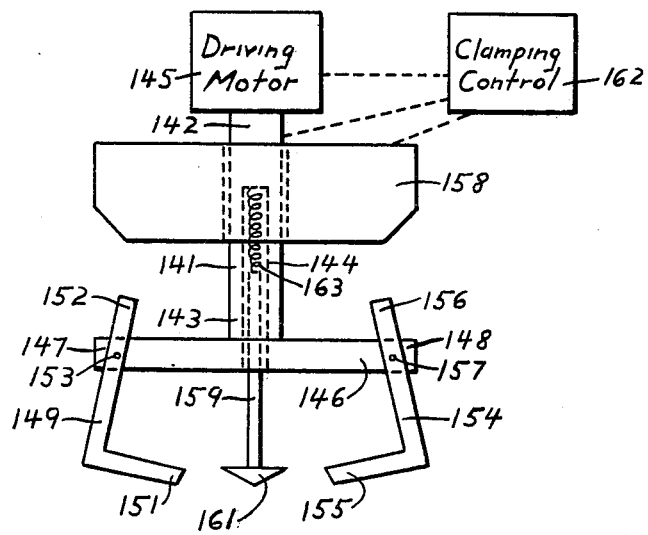
FIGS. 8a and 8b are side views of an embodiment of the automatic clamping device of the present invention.
Figure 8B:
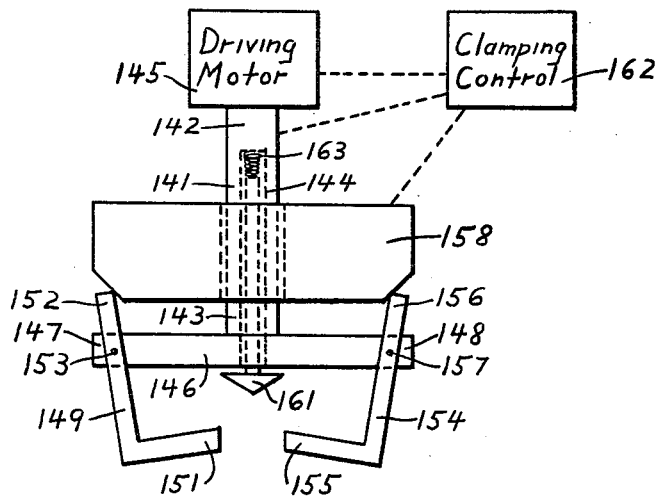

FIGS. 8a and 8b are side views of an embodiment of an automatic clamping device for clamping, rotating and driving a coupling component such as, for example, a second coupling component of the type shown in FIGS. 4a to 4i, into coupled relationship with a first coupling component of the type shown in FIGS. 3a to 3i. A substantially vertically positioned shaft 141 positioned substantially perpendicularly to the planar base portion 11 having an axis, an upper region 142, and an axial aperture 144 in the lower region thereof is rotated about its axis by driving means 145. The driving means 145 may comprise any suitable driving arrangement such as, for example, a motor.

A support arm 146 having a pair of extremities 147 and 148 is affixed to the shaft 141 in the lower region 143 thereof and is adapted to rotate with said shaft. The support arm 146 is preferably positioned perpendicularly to the axis of the shaft 141 and is either non-obstructive of the axial aperture 144 or has a coaxial aperture therethrough. A first clamping arm 149 of substantially elongated configuration having one clamping end 151 and another free end 152 is pivotally mounted at a point 153 positioned between the ends 151 and 152 thereof at the extremity 147 of the support arm 146 by suitable pivot means. A second clamping arm 154 of substantially elongated configuration having one clamping end 155 and another free end 156 is pivotally mounted at a point 157 positioned between the ends 155 and 156 thereof at the extremity 148 of the support arm 146 by suitable pivot means. Thus, when the shaft 141 is rotated at higher than a predetermined speed, the support arm 146 rotates with said shaft and the clamping arms 149 and 154 are pivoted by centrifugal force with their clamping ends spaced a first distance from each other and with their free ends 152 and 156 spaced a second distance smaller than the first distance from each other.

A control ring 158 of substantially annular configuration is slidably mounted on the shaft 141 in substantially the upper region 142 thereof. The control ring 158 is held in substantially the upper region 142 of the shaft 141 spaced from the free ends of the clamping arms 149 and 154, as shown in FIG. 8a, when said shaft is rotated at higher than said predetermined speed. The control ring 158 slides under gravitational force to a position lower than the first-mentioned position, as shown in FIG. 8b, wherein said control ring is in its lower position and abuts the free ends 152 and 156 of the clamping arms 149 and 154, respectively, and urges said free ends of said clamping arms away from each other to a third distance from each other, the third distance of the free ends 152 and 156 of the clamping arms 149 and 154, respectively, being greater than each of the first and second distances, so that the clamping ends 151 and 155 of said clamping arms are urged toward each other to a fourth distance from each other, the fourth distance of the clamping ends from each other being smaller than each of the first, second and third distances, so that said clamping ends are positioned to enable the clamping arms 149 and 154 to clamp a second coupling component between the said clamping ends to said clamping arms and to enable the said clamping arms to rotate and drive said second coupling component when, after a predetermined period of time, the shaft 141 is rotated at lower than said predetermined speed.

A spring-biased pin 159 is housed in the aperture 144 of the shaft 141 and extends from said shaft in the axial direction thereof. A substantially conical pinhead 161 on the outermost end of the pin 159 is adapted to abut the second end 123 of the second coupling component 121 with the apex of said pinhead adapted to be positioned in the aperture 124 of said second coupling component thereby to direct the said second coupling component into coaxial alignment with the shaft 141.

A clamping control 162 moves the shaft 141 into and out of a desired clamping position with relation to the planar base portion 11. The clamping control 162 holds the control ring 158 in substantially the upper region of the shaft 141 spaced from the free ends 152 and 156 of the clamping arms 149 and 154 and releases said control ring after said predetermined period of time. The clamping control 162 also controls the speed of rotation of the shaft 141 in correspondence with the position of said shaft in relation to the planar base portion 11.

The clamping control 162 may comprise any suitable control means such as, for example, a prime mover or cam arrangement adapted to shift the position of the shaft 141 in relation to the planar base portion 11, to hold and release the control ring 158 as desired and to control the speed of rotation of said shaft. In order to preserve the clarity of presentation, the clamping control 162 is shown as a block with dotted lines indicating control couplings extending therefrom to the shaft 141, the control ring 158 and the driving motor 145. The clamping control 162 may include electromagnetic relays.

The clamping control 162 is preferably adapted and adjusted to initially shift the shaft 141 at a distance from the planar base portion 11, initially provide a speed of rotation of said shaft higher than said predetermined speed and initially hold the control ring 158 in substantially the upper region of said shaft spaced from the free ends 152 and 156 of the clamping arms 149 and 154. The clamping ends 151 and 155 are thus initially spaced a distance apart from each other and the pinhead 161 of the pin 159 extends a distance apart from the lower region of the shaft 141 and is held in position by a spring 163 biasing it.

The clamping control 162 then shifts the shaft 141 closer to the planar base portion 11, and as the pinhead 161 contacts the end of the second coupling component 121 reduces the speed of rotation of said shaft and releases the control ring 158. The control ring 158 then drops under gravitational force and forces the free ends of the clamping arrows apart thereby pivoting said clamping arms to force the clamping ends 151 and 155 thereof into clamping relation with the second coupling component 121. The relatively low speed of rotation of the shaft 141 permits the clamping arms to properly couple the second coupling component 121 with the first coupling component 91. After a few turns of the second coupling component 121 into the first coupling component 91, the pinhead is forced by the end of said second coupling component closer to the shaft 141 against the force of the spring 163. The pin 159 may be adapted to actuate the clamping control 162, when it is recessed a predetermined distance into its aperture 144 thereby indicating suitable coupling of the first and second coupling components, to cause said clamping control to shift the shaft 141 away from the planar base portion 11 clear of the coupled coupling components and to increase the speed of rotation of said shaft to a speed higher than said predetermined speed so that the clamping ends of the clamping arms will move apart under centrifugal force and force the control ring 158 back to its initial position whence said clamping control 162 will hold said control ring in the upper region of said shaft.

Each of the clamping ends 151 and 155 may comprise any suitable means for enabling the clamping, rotating and driving of a coupling component, such as, for example, jaw-like teeth, a rough surfaced strip of material, a surface of selected configuration, or merely a substantially semi-cylindrical configuration.

The control ring 158 preferably has a predetermined weight and the pivot means are selected so that the effect of said control ring abutting the free ends 152 and 156 of the clamping arms 149 and 154, respectively, is to apply a substantially light pressure to the second coupling component through the clamping ends 151 and 155. The application of this substantially light pressure to the second coupling component enables said second coupling component to be rotated and driven sufficiently to couple it with the first coupling component and also enables the clamping ends to be readily removed from the said second coupling component after the coupling operation is completed. The automatic clamping device of the present invention may clamp, rotate and drive any of a great variety of types of coupling components.

The various prime mover and cam-controlled operations hereinbefore described is, of course, preferably controlled by a single control means to provide smooth coordination and cooperation between said operations and thereby effect efficient, reliable and rapid operation of the automatic coupling apparatus of the present invention. Thus, the coordinated control means preferably controls the first coupling component, sleeve and second coupling component supply means to control and coordinate the supply of the first coupling components, the second coupling components and the sleeves. The coordinated control means preferably controls the rod-moving means to control and coordinate the movement of the first and second coupling components to the guide means and preferably controls any transporting means which may be utilized to control and coordinate the moving of the first coupling component to the planar base portion. The coordinated control means preferably also controls the clamping control means to control and coordinate its aforementioned functions with the coordinated control of the supply means, moving means and any transporting means as well as with each other.

The coordinated control means therefore provides a coordinated sequence of operations including positioning a first coupling component on the planar base portion, positioning a sleeve in the aperture of said first coupling component, positioning a second coupling component on the first end of said first coupling component with the first end of said second coupling component in coupling contact with said first end of said first coupling component, and coupling said first and second coupling components to each other with said sleeve in the aperture of said first coupling component.

While the invention has been described by means of specific examples and in specific embodiments, I do not wish to be limited thereto, for obvious modifications will occur to those skilled in the art without departing from the spirit and scope of the invention.

What I claim is:

1. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end having second cross-sectional dimensions smaller than said last-mentioned first cross-sectional dimensions, comprising, in combination, first automatic positioning means for positioning a first coupling component in a predetermined location with one of the first and second ends thereof parallel to and supported in the said predetermined location; second automatic positioning means for positioning a second coupling component on the other of the first and second ends of said first coupling component in said predetermined location with one of the first and second ends of said second coupling component in coupling contact with said other of the first and second ends of said first coupling component; and clamping means for automatically coupling said first and second coupling components.

2. Automatic coupling apparatus for coupling a first coupling component having a threaded axial aperture formed therethrough, a first end having a first inner diameter and a second end opposite to said first end having a second inner diameter smaller than said first inner diameter to a second coupling component having a threaded axial aperture formed therethrough, a first threaded end having a first outer diameter and a first inner diameter and a second threaded end opposite to said first end and having a second outer diameter smaller than the first outer diameter of said last-mentioned first end and a second inner diameter smaller than the first inner diameter of said last-mentioned first end, the first end of said second coupling component being adapted to threadedly couple with the first end of said first coupling component, comprising, in combination, first automatic positioning means for positioning a first coupling component in a predetermined location with the second end thereof parallel to and suported in said predetermined location; second automatic positioning means for positioning a second coupling component on the first end of said first coupling component in said predetermined location with the first end of said second coupling component in coupling contact with said first end of said first coupling component; and clamping means for automatically coupling said first and second coupling components.

3. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location, said first automatic positioning means comprising first selecting means having an axis and a first engaging end portion having cross-sectional dimensions adapted to cause said first engaging end portion to abut said first coupling component when the said first engaging end portion is urged toward one of said first and second ends of the said first coupling component and adapted to cause said first engaging end portion to carry the said first coupling component when the said first engaging end portion is urged toward the other of said first and second ends of the said first coupling component, second selecting means having an axis and a second engaging end portion having cross-sectional dimensions adapted to cause said second engaging end portion to abut said first coupling component when the said second engaging end portion is urged toward each of the first and second ends of said first coupling component, first supply means for supplying said first coupling component in substantially coaxial relation with said first and second selecting means in a first area in the path of movement of said first selecting means and adjacent the engaging end portion of each of said first and second selecting means when said first and second selecting means are in a first position, first guide means extending from said predetermined location and opening into near proximity with the path of movement of said first and second selecting means at a first distance from the engaging end portion of said first selecting means and the engaging end portion of said second selecting means in a second position, second guide means extending from said predetermined location and opening into near proximity with the path of movement of said first and second selecting means at a second distance from the engaging end portions of the said first and second selecting means between the engaging end portion of said second selecting means in its second position and the opening of said first guide means, and first moving means for moving said first and second selecting means in their axial direction from a first position of said first selecting means and a maximum extended first position of said second selecting means to a maximum extended second position of said first selecting means spaced from its first position and a second position of said second selecting means spaced from its first position and back to said first position so that a first coupling component positioned in said first area with one of its first and second ends adjacent the engaging end portion of said first selecting means and the other of its first and second ends adjacent the engaging end portion of said second selecting means is carried by said first selecting means and is abutted by said second selecting means in the axial direction thereof into the opening of said first guide means when said first selecting means is in its second position and said second selecting means is in an intermediate position and a first coupling component positioned in said first area with the other of its first and second ends adjacent the engaging end portion of said first selecting means and said one of its first and second ends adjacent the engaging end portion of said second selecting means is pushed by said first selecting means and is abutted by said second selecting means in the axial direction thereof into the opening of said second guide means when said first and second selecting means are in their second position, one of said first and second guide means being formed to convey said first coupling component to said predetermined location with said one of said first and second ends thereof parallel to and supported in the said predetermined location and the other of said first and second guide means being formed to convey said first coupling component to said predetermined location with the said one of said first and second ends thereof parallel to and supported in said predetermined location; second automatic positioning means for positioning a second coupling component on the other of the first and second ends of said first coupling component in said predetermined location with one of the first and second ends of said second coupling component in coupling contact with said other of said first and second ends of said first coupling component; and clamping means for automatically coupling said first and second coupling components.

4. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location; second automatic positioning means for positioning a second coupling component on the other of the first and second ends of said first coupling component in said predetermined location with one of the first and second ends of said second coupling component in coupling contact with said other of said first and second ends of said first coupling component, said second automatic positioning means comprising selecting means having an axis and an engaging end portion having cross-sectional dimensions adpated to cause said engaging end portion to abut said second coupling component when said engaging end portion is urged toward one of the first and second ends of the said second coupling component and adapted to cause the said engaging end portion to carry the said second coupling component when the said engaging end portion is urged toward the other of the first and second ends of the said second coupling component, supply means for supplying said second coupling component in substantially coaxial relation with said selecting means in a first area in the path of movement of said selecting means and adjacent the engaging end portion of said selecting means when said selecting means is in a first position, first guide means extending from substantial proximity to said first coupling component in said predetermined location and opening into the path of movement of said selecting means at a first distance from the engaging end portion of the said selecting means beyond said first area, second guide means extending from substantial proximity to said first coupling component in said predetermined location and opening into the path of movement of said selecting means at a second distance from the engaging end portion of said selecting means beyond said first distance, catch means affixed at the edge of the opening of said second guide means farthest from the engaging end portion of said selecting means, and moving means for moving said selecting means in its axial direction from a first position to a maximum extended second position spaced from its first position and back to its first position so that a second coupling component positioned in said first area with one of its first and second ends adjacent the engaging end portion of said selecting means and the other of its first and second ends spaced therefrom is pushed by said selecting means in the axial direction thereof said other end first into the opening of said first guide means and a second coupling component positioned in said first area with said other of its first and second ends adjacent the engaging end portion of said selecting means and said one end spaced therefrom is carried by said selecting means in the axial direction thereof to the opening of said second guide means and when said selecting means reaches its maximum extended second position said one end of said second coupling component is engaged by said catch means and said second coupling component drops said other end first into said second guide means when the said selecting means is moved back to its first position; and clamping means for coupling said second coupling component with said first coupling component.

5. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location; second automatic positioning means for positioning a second coupling component on the other of the first and second ends of said first coupling component in said predetermined location with one of the first and second ends of said second coupling component in coupling contact with said other of said first and second ends of said first coupling component, said second automatic positioning means comprising selecting means having an axis and a substantially cup-like engaging end portion having inner cross-sectional dimensions adapted to cause said engaging end portion to abut said second coupling component when said engaging end portion is urged toward one of the first and second ends o the said second coupling component and adapted to cause the said engaging end portion to carry the said second coupling component in said cup-like engaging end portion when the said engaging end portion is urged toward the other of the first and second ends of the said second coupling component, supply means for supplying said second coupling component in substantialy coaxial relation with said selecting means in a first area in the path of movement of said selecting means and adjacent the engaging end portion of said selecting means when said selecting means is in a first position, first guide means extending from substantial proximity to said first coupling component in said predetermined location and opening into the path of movement of said selecting means at a first distance from the engaging end portion of the said selecting means beyond said first area, second guide means extending from substantial proximity to said first coupling component in said predetermined location and opening into the path of movement of said selecting means at a second distance from the engaging end portion of said selecting means beyond said first distance, catch means affixed at the edge of the opening of said second guide means farthest from the engaging end portion of said selecting means, and moving means for moving said selecting means in its axial direction from a first position to a maximum extended second position spaced from its first position and back to its first position so that a second coupling component positioned in said first area with one of its first and second ends adjacent the engaging end portion of said selecting means and the other of its first and second ends spaced therefrom is pushed by said selecting means in the axial direction thereof said other end first into the opening of said first guide means and a second coupling component positioned in said first area with said other of its first and second ends adjacent the engaging end portion of said selecting means and said one end spaced therefrom is carried by said selecting means in the axial direction thereof to the opening of said second guide means and when said selecting means reaches its maximum extended second position said one end of said second coupling component is engaged by said catch means and said second coupling component drops said other end first into said second guide means when the said selecting means is moved back to its first position; and clamping means for coupling said second coupling component with said first coupling component.

6. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location; second automatic positioning means for positioning a second coupling component on the other of the first and second ends of said first coupling component in said predetermined location with one of the first and second ends of said second coupling component in coupling contact with said other of said first and second ends of said first coupling component; and clamping means for automatically coupling said first and second coupling components, said clamping means being adapted to rotate and comprising a pair of clamping means and clamping control means for positioning said clamping means in spaced relation from each other a first distance apart under the control of centrifugal force and for positioning said clamping means in spaced relation from each other a smaller second distance apart under the control of gravitational force, said clamping means at said second distance from each other being enabled to clamp a coupling component between them and to rotate and drive said coupling component.

7. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location, said first automatic positioning means comprising first selecting means having an axis and a first engaging end portion having cross-sectional dimensions adapted to cause said first engaging end portion to abut said first coupling component when the said first engaging end portion is urged toward one of said first and second ends of the said first coupling component and adapted to cause said first engaging end portion to carry the said first coupling component when the said first engaging end portion is urged toward the other of said first and second ends of the said first coupling component, second selecting means having an axis and a second engaging end portion having cross-sectional dimensions adapted to cause said second engaging end portion to abut said first coupling component when the said second engaging end portion is urged toward each of the first and second ends of said first coupling component, first supply means for supplying said first coupling component in substantially coaxial relation with said first and second selecting means in a first area in the path of movement of said first selecting means and adjacent the engaging end portion of each of said first and second selecting means when said first and second selecting means are in a first position, first guide means extending from said predetermined location and opening into near proximity with the path of movement of said first and second selecting means at a first distance from the engaging end portion of said first selecting means and the engaging end portion of said second selecting means in a second position, second guide means extending from said predetermined location and opening into near proximity with the path of movement of said first and second selecting means at a second distance from the engaging end portions of the said first and second selecting means between the engaging end portion of said second selecting means in its second position and the opening of said first guide means, and first moving means for moving said first and second selecting means in their axial direction from a first position of said first selecting means and a maximum extended first position of said second selecting means to a maximum extended second position of said first selecting means spaced from its first position and a second position of said second selecting means spaced from its first position and back to said first position so that a first coupling component positioned in said first area with one of its first and second ends adjacent the engaging end portion of said first selecting means and the other of its first and second ends adjacent the engaging end portion of said second selecting means is carried by said first selecting means and is abutted by said second selecting means in the axial direction thereof into the opening of said first guide means when said first selecting means is in its second position and said second selecting means is in an intermediate position and a first coupling component positioned in said first area with the other of its first and second ends adjacent the engaging end portion of said first selecting means and said one of its first and second ends adjacent the engaging end portion of said second selecting means is pushed by said first selecting means and is abutted by said second selecting means in the axial direction thereof into the opening of said second guide means when said first and second selecting means are in their second position, one of said first and second guide means being formed to convey said first coupling component to said predetermined location with said one of said first and second ends thereof parallel to and supported in the said predetermined location and the other of said first and second guide means being formed to convey said first coupling component to said predetermined location with the said one of said first and second ends thereof parallel to and supported in said predetermined location; second automatic positioning means for positioning a second coupling component on the other of the first and second ends of said first coupling component in said predetermined location with one of the first and second ends of said second coupling component in coupling contact with said other of said first and second ends of said first coupling component, said second automatic positioning means comprising third selecting means having an axis and a third engaging end portion having cross-sectional dimensions adapted to cause said third engaging end portion to abut said second coupling component when said third engaging end portion is urged toward one of the first and second ends of the said second coupling component and adapted to cause the said third engaging end portion to carry the said second coupling component when the said third engaging end portion is urged toward the other of the first and second ends of the said second coupling component, second supply means for supplying said second coupling component in substantially coaxial relation with said third selecting means in a first area in the path of movement of said third selecting means and adjacent the third engaging end portion of said third selecting means when said third selecting means is in a first position, third guide means extending from substantial proximity to said first coupling component in said predetermined location and opening into the path of movement of said third selecting means at a first distance from the engaging end portion of the said third selecting means beyond said last-mentioned first area, fourth guide means extending from substantial proximity to said first coupling component in said predetermined location and opening into the path of movement of said third selecting means at a second distance from the engaging end portion of said third selecting means beyond said first distance, catch means affixed at the edge of the opening of said fourth guide means farthest from the engaging end portion of said third selecting means, and second moving means for moving said third selecting means in its axial direction from a first position to a maximum extended second position spaced from its first position and back to its first position so that a second coupling component positioned in said last-mentioned first area with one of its first and second ends adjacent the engaging end portion of said third selecting means and the other of its first and second ends spaced therefrom is pushed by said third selecting means in the axial direction thereof said other end first into the opening of said third guide means and a second coupling component positioned in said last-mentioned first area with said other of its first and second ends adjacent the engaging end portion of said third selecting means and said one end spaced therefrom is carried by said third selecting means in the axial direction thereof to the opening of said fourth guide means and when said third selecting means reaches its maximum extended second position said one end of said second coupling component is engaged by said catch means and said second coupling component drops said other end first into said fourth guide means when the said third selecting means is moved back to its first position; and clamping means for coupling said second coupling component with said first coupling component.

8. Automatic coupling apparatus including a substantially planar base portion for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component on said planar base portion with one of the first and second ends thereof parallel to and supported by the said planar base portion, said first automatic positioning means comprising first supporting means positioned above said planar base portion, a first rod having an axis and a first engaging end portion having cross-sectional dimensions adapted to cause said first engaging end portion to abut said first coupling component when the said first engaging end portion is urged toward one of said first and second ends of the said first coupling component and adapted to cause said first engaging end portion to carry the said first coupling component when the said first engaging end portion is urged toward the other of said first and second ends of the said first coupling component, first mounting means slidably supporting said first rod on said first supporting means, said first rod being axially movable in said first mounting means from a first position to a maximum extended second position spaced from said first position, a second rod having an axis and a second engaging end portion having cross-sectional dimensions adapted to cause said second engaging end portion to abut said first coupling component when the said second engaging end portion is urged toward each of the first and second ends of said first coupling component, second mounting means slidably supporting said second rod coaxially with said first rod on said first supporting means, said second rod being axially movable in said second mounting means from a maximum extended first position between the first position of said first rod and said second mounting means to a second position spaced from said first position between the second position of said first rod and the said second mounting means, first supply means for supplying said first coupling component in substantially coaxial relation with said first and second rods in a first area in the path of movement of said first rod and adjacent the engaging end portion of each of said first and second rods when said first and second rods are in their first position, first guide means extending from substantial proximity to said planar base portion and opening into near proximity with the path of movement of said first and second rods at a first distance from the engaging end portion of said first rod and the engaging end portion of said second rod in its second position, second guide means extending from substantial proximity to said planar base portion and opening into near proximity with the path of movement of said first and second rods at a second distance from the engaging end portions of the said first and second rods between the engaging end portion of said second rod in its second position and the opening of said first guide means, and first moving means for moving said first and second rods in their axial direction from said first position to said second position and back to said first position so that a first coupling component positioned in said first area of said first supporting means with one of its first and second ends adjacent the engaging end portion of said first rod and the other of its first and second ends adjacent the engaging end portion of said second rod is carried by said first rod and is abutted by said second rod in the axial direction thereof into the opening of said first guide means when said first rod is in its second position and said second rod is in an intermediate position and a first coupling component positioned in said first area of said first supporting means with the other of its first and second ends adjacent the engaging end portion of said first rod and said one of its first and second ends adjacent the engaging end portion of said second rod is pushed by said first rod and is abutted by said second rod in the axial direction thereof into the opening of said second guide means when said first and second rods are in their second position, one of said first and second guide means being formed to convey said first coupling component to said planar base portion with said one of said first and second ends thereof parallel to and supported by the said planar base portion and the other of said first and second guide means being formed to convey said first coupling component to said planar base portion with the said one of said first and second ends thereof parallel to and supported by the said planar base portion; second automatic positioning means for positioning a second coupling component on the other of the first and second ends of said first coupling component on said planar base portion with one of the first and second ends of said second coupling component in coupling contact with said other of said first and second ends of said first coupling component, said second automatic positioning means comprising second supporting means positioned above said planar base portion, a third rod having an axis and a third engaging end portion having cross-sectional dimensions adapted to cause said third engaging end portion to abut said second coupling component when said third engaging end portion is urged toward one of the first and second ends of the said second coupling component and adapted to cause the said third engaging end portion to carry the said second coupling component when the said third engaging end portion is urged toward the other of the first and second ends of the said second coupling component, third mounting means slidably supporting said third rod on said second supporting means, said third rod being axially movable in said third mounting means from a first position to a maximum extended second position spaced from said first position, second supply means for supplying said second coupling component to said second supporting means in substantially coaxial relation with said third rod in a first area in the path of movement of said third rod and adjacent the third engaging end portion of said third rod when said third rod is in its first position, third guide means extending from substantial proximity to said first coupling component on said planar base portion and opening into said second supporting means in the path of movement of said third rod at a first distance from the engaging end portion of the said third rod beyond said first area of said second supporting means, fourth guide means extending from substantial proximity to said first coupling component on said planar base portion and opening into said second supporting means in the path of movement of said third rod at a second distance from the engaging end portion of said third rod beyond said first distance, catch means on said second supporting means at the edge of the opening of said fourth guide means farthest from the engaging end portion of said third rod, and second moving means for moving said third rod in its axial direction from its first position to its maximum extended second position and back to its first position so that a second coupling component positioned in said first area of said second supporting means with one of its first and second ends adjacent the engaging end portion of said third rod and the other of its first and second ends spaced therefrom is pushed by said third rod in the axial direction thereof said other end first into the opening of said third guide means and a second coupling component positioned in said first area of said second supporting means with said other of its first and second ends adjacent the engaging end portion of said third rod and said one end spaced therefrom is carried by said third rod in the axial direction thereof to the opening of said fourth guide means and when said third rod reaches its maximum extended second position said one end of said second coupling component is engaged by said catch means and said second coupling component drops said other end first into said fourth guide means when the said third rod is moved back to its first position; and clamping means for coupling said second coupling component with said first coupling component.

9. Automatic coupling apparatus including a substantially planar base portion for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component on said planar base portion with one of the first and second ends thereof parallel to and supported by the said planar base portion, said first automatic positioning means comprising first supporting means positioned above said planar base portion, a first rod having an axis and a first engaging end portion having cross-sectional dimensions adapted to cause said first engaging end portion to abut said first coupling component when the said first engaging end portion is urged toward one of said first and second ends of the said first coupling component and adapted to cause said first engaging end portion to carry the said first coupling component when the said first engaging end portion is urged toward the other of said first and second ends of the said first coupling component, first mounting means slidably supporting said first rod on said first supporting means, said first rod being axially movable in said first mounting means from a first position to a maximum extended second position spaced from said first position, a second rod having an axis and a second engaging end portion having cross-sectional dimensions adapted to cause said second engaging end portion to abut said first coupling component when the said second engaging end portion is urged toward each of the first and second ends of said first coupling component, second mounting means slidably supporting said second rod coaxially with said first rod on said first supporting means, said second rod being axially movable in said second mounting means from a maximum extended first position between the first position of said first rod and said second mounting means to a second position spaced from said first position between the second position of said first rod and the said second mounting means, first supply means for supplying said first coupling component in substantially coaxial relation with said first and second rods in a first area in the path of movement of said first rod and adjacent the engaging end portion of each of said first and second rods when said first and second rods are in their first position, first guide means extending from substantial proximity to said planar base portion and opening into near proximity with the path of movement of said first and second rods at a first distance from the engaging end portion of said first rod and the engaging end portion of said second rod in its second position, second guide means extending from substantial proximity to said planar base portion and opening into near proximity with the path of movement of said first and second rods at a second distance from the engaging end portions of the said first and second rods between the engaging end portion of said second rod in its second position and the opening of said first guide means, and first moving means for moving said first and second rods in their axial direction from said first position to said second position and back to said first position so that a first coupling component positioned in said first area of said first supporting means with one of its first and second ends adjacent the engaging end portion of said first rod and the other of its first and second ends adjacent the engaging end portion of said second rod is carried by said first rod and is abutted by said second rod in the axial direction thereof into the opening of said first guide means when said first rod is in its second position and said second rod is in an intermediate position and a first coupling component positioned in said first area of said first supporting means with the other of its first and second ends adjacent the engaging end portion of said first rod and said one of its first and second ends adjacent the engaging end portion of said second rod is pushed by said first rod and is abutted by said second rod in the axial direction thereof into the opening of said second guide means when said first and second rods are in their second position, one of said first and second guide means being formed to convey said first coupling component to said planar base portion with said one of said first and second ends thereof parallel to and supported by the said planar base portion and the other of said first and second guide means being formed to convey said first coupling component to said planar base portion with the said one of said first and second ends thereof parallel to and supported by the said planar base portion; second automatic positioning means for positioning a second coupling component on the other of the first and second ends of said first coupling component on said planar base portion with one of the first and second ends of said second coupling component in coupling contact with said other of said first and second ends of said first coupling component, said second automatic positioning means comprising second supporting means positioned above said planar base portion, a third rod having an axis and a third engaging end portion having cross-sectional dimensions adapted to cause said third engaging end portion to abut said second coupling component when said third engaging end portion is urged toward one of the first and second ends of the said second coupling component and adapted to cause the said third engaging end portion to carry the said second coupling component when the said third engaging end portion is urged toward the other of the first and second ends of the said second coupling component, third mounting means slidably supporting said third rod on said second supporting means, said third rod being axially movable in said third mounting means from a first position to a maximum extended second position spaced from said first position, second supply means for supplying said second coupling component to said second supporting means in substantially coaxial relation with said third rod in a first area in the path of movement of said third rod and adjacent the third engaging end portion of said third rod when said third rod is in its first position, third guide means extending from substantial proximity to said first coupling component on said planar base portion and opening into said second supporting means in the path of movement of said third rod at a first distance from the engaging end portion of the said third rod beyond said first area of said second supporting means, fourth guide means extending from substantial proximity to said first coupling component on said planar base portion and opening into said second supporting means in the path of movement of said third rod at a second distance from the engaging end portion of said third rod beyond said first distance, catch means on said second supporting means at the edge of the opening of said fourth guide means farthest from the engaging end portion of said third rod, and second moving means for moving said third rod in its axial direction from its first position to its maximum extended second position and back to its first position so that a second coupling component positioned in said first area of said second supporting means with one of its first and second ends adjacent the engaging end portion of said third rod and the other of its first and second ends spaced therefrom is pushed by said third rod in the axial direction thereof said other end first into the opening of said third guide means and a second coupling component positioned in said first area of said second supporting means with said other of its first and second ends adjacent the engaging end portion of said third rod and said one end spaced therefrom is carried by said third rod in the axial direction thereof to the opening of said fourth guide means and when said third rod reaches its maximum extended second position said one end of said second coupling component is engaged by said catch means and said second coupling component drops said other end first into said fourth guide means when the said third rod is moved back to its first position; and clamping means for coupling said second coupling component with said first coupling component, said clamping means comprising a shaft positioned substantially perpendicularly to said planar base portion and having an axis, an upper region and a lower region, driving means for rotating said shaft about its axis, support means having a pair of extremities and carried by said shaft in the lower region thereof and adapted to rotate therewith, said support means being positioned transversely to the axis of said shaft, a pair of clamping means each having a clamping end and a free opposite end, pivot means pivotally mounting one of said clamping means at a point positioned between the ends thereof at each extremity of said supporting means so that when said shaft is rotated at higher than a predetermined speed said support means rotates therewith and said clamping means are pivoted by centrifugal force with their clamping ends spaced a first distance from each other and with their free ends spaced a second distance smaller than said first distance from each other, control means for permitting said clamping means to remain pivoted with their clamping ends spaced said first distance from each other and with their free ends spaced said second distance from each other and after a predetermined period of time for urging said free ends of the said clamping means away from each other to a third distance from each other greater than each of said first and second distances so that the clamping ends of said clamping means are urged toward each other to a fourth distance from each other smaller than each of said first, second and third distances thereby positioning said clamping ends of said clamping means to enable the said clamping means to clamp a second coupling component between the said clamping ends thereof and to rotate and drive the said second coupling component.

10. Automatic coupling apparatus including a substantially planar base portion for coupling a first coupling component having a threaded axial aperture formed therethrough, a first end having a first inner diameter and a second end opposite to said first end having a second inner diameter smaller than said first inner diameter to a second coupling component having a threaded axial aperture formed therethrough, a first threaded end having a first outer diameter and a first inner diameter and a second threaded end opposite to said first end and having a second outer diameter smaller than the first outer diameter of said last-mentioned first end and a second inner diameter smaller than the first inner diameter of said last-mentioned first end, the first end of said second coupling component being adapted to threadedly couple with the first end of said first coupling component, comprising, in combination, first automatic positioning means for positioning a first coupling component on said planar base portion with the second end thereof parallel to and supported by the said planar base portion, said first automatic positioning means comprising first supporting means positioned above said planar base portion, a first rod having an axis and a first engaging end portion having a diameter larger than the second inner diameter of the second end of said first coupling component and smaller than the first inner diameter of the first end of the said first coupling component and adapted to move freely through said first end of said first coupling component into the aperture thereof, first mounting means slidably supporting said first rod on said first supporting means, said first rod being axially movable in said first mounting means from a first position to a maximum extended second position spaced from said first position, a second rod having an axis and a second engaging end portion having a diameter larger than the first and second inner diameters of the first and second ends of said first coupling component, second mounting means slidably supporting said second rod coaxially with said first rod on said first supporting means; said second rod being axially movable in said second mounting means from a maximum extended first position between the first position of said first rod and said second mounting means to a second position spaced from said first position between the second position of said first rod and the said second mounting means, first supply means for supplying said first coupling component in substantially coaxial relation with said first and second rods in a first area in the path of movement of said first rod and adjacent the engaging end portion of each of said first and second rods when said first and second rods are in their first position, first guide means extending from substantial proximity to said planar base portion and opening into near proximity with the path of movement of said first and second rods at a first distance from the engaging end portion of said first rod and the engaging end portion of said second rod in its second position, second guide means extending from substantial proximity to said planar base portion and opening into near proximity with the path of movement of said first and second rods at a second distance from the engaging end portions of the said first and second rods between the engaging end portion of said second rod in its second position and the opening of said first guide means, and first moving means for moving said first and second rods in their axial direction from said first position to said second position and back to said first position so that a first coupling component positioned in said first area of said first supporting means with its first end adjacent the engaging end portion of said first rod and its second end adjacent the engaging end portion of said second rod is carried by said first rod and is abutted by said second rod in the axial direction thereof into the opening of said first guide means when said first rod is in its second position and said second rod is in an intermediate position and a first coupling component positioned in said first area of said first supporting means with its second end adjacent the engaging end portion of said first rod and its first end adjacent the engaging end portion of said second rod is pushed by said first rod and is abutted by said second rod in the axial direction thereof into the opening of said second guide means when said first and second rods are in their second position, one of said first and second guide means being formed to convey said first coupling component to said planar base portion with said second end thereof parallel to and supported by the said planar base portion and the other of said first and second guide means being formed to convey said first coupling component to said planar base portion with said second end thereof parallel to and supported by the said planar base portion; second automatic positioning means for positioning a second coupling component on the first end of said first coupling component on said planar base portion with the first end of said second coupling component in coupling contact with said first end of said first coupling component, said second automatic positioning means comprising second supporting means positioned above said planar base portion, a third rod having an axis and a third engaging end portion having a diameter larger than the second inner diameter of the second end of said second coupling component and smaller than the first inner diameter of the first end of said second coupling component and adapted to move freely through said first end of said second coupling component into the aperture thereof, third mounting means slidably supporting said third rod on said second supporting means, said third rod being axially movable in said third mounting means from a first position to a maximum extended second position spaced from said first position, second supply means for supplying said second coupling component to said second supporting means in substantially coaxial relation with said third rod in a first area in the path of movement of said third rod and adjacent the third engaging end portion of said third rod when said third rod is in its first position, third guide means extending from substantial proximity to said first coupling component on said planar base portion and opening into said second supporting means in the path of movement of said third rod at a first distance from the engaging end portion of the said third rod beyond said first area of said second supporting means, fourth guide means extending from substantial proximity to said first coupling component on said planar base portion and opening into said second supporting means in the path of movement of said third rod at a second distance from the engaging end portion of said third rod beyond said first distance, catch means on said second supporting means at the edge of the opening of said fourth guide means farthest from the engaging end portion of said third rod, and second moving means for moving said third rod in its axial direction from its first position to its maximum extended second position and back to its first position so that a second coupling component positioned in said first area of said second supporting means with its second end adjacent the engaging end portion of said third rod and its first end spaced therefrom is pushed by said third rod in the axial direction thereof said first end first into the opening of said third guide means and a second coupling component positioned in said first area of said second supporting means with its first end adjacent the engaging end portion of said third rod and with its second end spaced therefrom is carried by said third rod in the axial direction thereof to the opening of said fourth guide means and when said third rod reaches its maximum extended second position said second end of said second coupling component is engaged by said catch means and said second coupling component drops said first end first into said fourth guide means when the said third rod is moved back to its first position; and clamping means for coupling said second coupling component with said first coupling component.

11. Automatic coupling apparatus including a substantially planar base portion for coupling a first coupling component having a threaded axial aperture formed therethrough, a first end having a first inner diameter and a second end opposite to said first end having a second inner diameter smaller than said first inner diameter to a second coupling component having a threaded axial aperture formed therethrough, a first threaded end having a first outer diameter and a first inner diameter and a second threaded end opposite to said first end and having a second outer diameter smaller than the first outer diameter of said last-mentioned first end and a second inner diameter smaller than the first inner diameter of said last-mentioned first end, the first end of said second coupling component being adapted to threadly couple with the first end of said first coupling component, comprising, in combination, first automatic positioning means for positioning a first coupling component on said planar base portion with the second end thereof parallel to and supported by the said planar base portion, said automatic positioning means comprising first supporting means positioned above said planar base portion, a first rod having an axis and a first engaging end portion having a diameter larger than the second inner diameter of the second end of said first coupling component and smaller than the first inner diameter of the first end of the said first coupling component and adapted to move freely through said first end of said first coupling component into the aperture thereof, first mounting means slidably supporting said first rod on said first supporting means, said first rod being axially movable in said first mounting means from a first position to a maximum extended second position spaced from said first position, a second rod having an axis and a second engaging end portion having a diameter larger than the first and second inner diameters of the first and second ends of said first coupling component, second mounting means slidably supporting said second rod coaxially with said first rod on said first supporting means, said second rod being axially movable in said second mounting means from a maximum extended first position between the first position of said first rod and said second mounting means to a second position spaced from said first position between the second position of said first rod and the said second mounting means, first supply means for supplying said first coupling component in substantially coaxial relation with said first and second rods in a first area in the path of movement of said first rod and adjacent the engaging end portion of each of said first and second rods when said first and second rods are in their first position, first guide means extending from substantial proximity to said planar base portion and opening into near proximity with the path of movement of said first and second rods at a first distance from the engaging end portion of said first rod and the engaging end portion of said second rod in its second position, second guide means extending from substantial proximity to said planar base portion and opening into near proximity with the path of movement of said first and second rods at a second distance from the engaging end portions of the said first and second rods between the engaging end portion of said second rod in its second position and the opening of said first guide means, and first moving means for moving said first and second rods in their axial direction from said first position to said second position and back to said first position so that a first coupling component positioned in said first area of said first supporting means with its first end adjacent the engaging end portion of said first rod and its second end adjacent the engaging end portion of said second rod is carried by said first rod and is abutted by said second rod in the axial direction thereof into the opening of said first guide means when said first rod is in its second position and said second rod is in an intermediate position and a first coupling component positioned in said first area of said first supporting means with its second end adjacent the engaging end portion of said first rod and its first end adjacent the engaging end portion of said second rod is pushed by said first rod and is abutted by said second rod in the axial direction thereof into the opening of said second guide means when said first and second rods are in their second position, one of said first and second guide means being formed to convey said first coupling component to said planar base portion with said second end thereof parallel to and supported by the said planar base portion and the other of said first and second guide means being formed to convey said first coupling component to said planar base portion with said second end thereof parallel to and supported by the said planar base portion; second automatic positioning means for positioning a second coupling component on the first end of said first coupling component on said planar base portion with the first end of said second coupling component in coupling contact with said first end of said first coupling component, said second automatic positioning means comprising second supporting means positioned above said planar base portion, a third rod having an axis and a third engaging end portion having a diameter larger than the second inner diameter of the second end of said second coupling component and smaller than the first inner diameter of the first end of said second coupling component and adapted to move freely through said first end of said second coupling component into the aperture thereof, third mounting means slidably supporting said third rod on said second supporting means, said third rod being axially movable in said third mounting means from a first position to a maximum extended second position spaced from said first position, second supply means for supplying said second coupling component to said second supporting means in substantially coaxial relation with said third rod in a first area in the path of movement of said third rod and adjacent the third engaging end portion of said third rod when said third rod is in its first position, third guide means extending from substantial proximity to said first coupling component on said planar base portion and opening into said second supporting means in the path of movement of said third rod at a first distance from the engaging end portion of the said third rod beyond said first area of said second supporting means, fourth guide means extending from substantial proximity to said first coupling component on said planar base portion and opening into said second supporting means in the path of movement of said third rod at a second distance from the engaging end portion of said third rod beyond said first distance, catch means on said second supporting means at the edge of the opening of said fourth guide means farthest from the engaging end portion of said third rod, and second moving means for moving said third rod in its axial direction from its first position to its maximum extended second position and back to its first position so that a second coupling component positioned in said first area of said second supporting means with its second end adjacent the engaging end portion of said third rod and its first end spaced therefrom is pushed by said third rod in the axial direction thereof said first end first into the opening of said third guide means and a second coupling component positioned in said first area of said second supporting means with its first end adjacent the engaging end portion of said third rod and with its second end spaced therefrom is carried by said third rod in the axial direction thereof to the opening of said fourth guide means and when said third rod reaches its maximum extended second position said second end of said second coupling component is engaged by said catch means and said second coupling component drops said first end first into said fourth guide means when the said third rod is moved back to its first position; and clamping means for coupling said second coupling component with said first coupling component, said clamping means comprising a shaft positioned substantially perpendicularly to said planar base portion and having an axis, an upper region, a lower region and an axial aperture in the lower region thereof, driving means for rotating said shaft about its axis, a support arm having a pair of extremities and affixed to said shaft in the lower region thereof and adapted to rotate therewith, said support arm being positioned perpendicularly to the axis of said shaft, a pair of clamping arms each being of substantially elongated configuration with a clamping end and a free opposite end, pivot means pivotally mounting one of said clamping arms at a point positioned between the ends thereof at each extremity of said support arm so that when said shaft is rotated at higher than a predetermined speed said support arm rotates therewith and said clamping arms are pivoted by centrifugal force with their clamping ends spaced a first distance from each other and with their free ends spaced a second distance smaller than said first distance from each other, a control ring slidably mounted on said shaft in substantially the upper region thereof, said control ring being held in substantially said upper region of said shaft spaced from the free ends of said clamping arms when said shaft is rotated at higher than said predetermined speed and said control ring sliding under gravitational force to a position lower than said first-mentioned position wherein the said control ring abuts the free ends of said clamping arms and urges said free ends of said clamping arms away from each other to a third distance from each other greater than each of said first and second distances so that the clamping ends of said clamping arms are urged toward each other to a fourth distance from each other smaller than each of said first, second and third distances thereby positioning said clamping ends of said clamping arms to enable the said clamping arms to clamp a second coupling component between the said clamping ends thereof and to rotate and drive the said second coupling component when, after a predetermined period of time, said shaft is rotated at lower than said predetermined speed, directing means for positioning said second coupling component substantially coaxially with said shaft, said directing means comprising a spring-biased pin housed in the aperture of said shaft and extending from said shaft in the axial direction thereof and a substantially conical pinhead on the outermost end of said pin, said pinhead being adapted to abut the second end of said second coupling component with the apex of said pinhead adapted to be positioned in the aperture of the said second coupling component thereby to direct the said second coupling component into coaxial alignment with the said shaft, and clamping control means for moving said shaft into and out of a desired clamping position with relation to said planar base portion, for holding said control ring in substantially said upper region of said shaft spaced from the free ends of said clamping arms, for releasing said control ring after said predetermined period of time and for controlling the speed of rotation of said shaft in correspondence with the position of the said shaft in relation to said planar base portion.

12. Automatic coupling apparatus including a substantially planar base portion for coupling a first coupling component having a threaded axial aperture formed therethrough, a first end having a first inner diameter and a second end opposite to said first end having a second inner diameter smaller than said first inner diameter to a second coupling component having a threaded axial aperture formed therethrough, a first threaded end having a first outer diameter and a first inner diameter and a second threaded end opposite to said first end and having a second outer diameter smaller than the first outer diameter of said last-mentioned first end and a second inner diameter smaller than the first inner diameter of said last-mentioned first end, the first end of said second coupling component being adapted to threadedly couple with the first end of said first coupling component, comprising, in combination, first automatic positioning means for positioning a first coupling component on said planar base portion with the second end thereof parallel to and supported by the said planar base portion, said first automatic positioning means comprising first supporting means positioned above said planar base portion, a first rod having an axis and a first engaging end portion having a diameter larger than the second inner diameter of the second end of said first coupling component and smaller than the first inner diameter of the first end of the said first coupling component and adapted to move freely through said first end of said first coupling component into the aperture thereof, first mounting means slidably supporting said first rod on said first supporting means, said first rod being axially movable in said first mounting means from a first position to a maximum extended second position spaced from said first position, a second rod having an axis and a second engaging end portion having a diameter larger than the first and second inner diameters of the first and second ends of said first coupling component, second mounting means slidably supporting said second rod coaxially with said first rod on said first supporting means, said second rod being axially movable in said second mounting means from a maximum extended first position between the first position of said first rod and said second mounting means to a second position spaced from said first position between the second position of said first rod and the said second mounting means, first supply means for supplying said first coupling component in substantially coaxial relation with said first and second rods in a first area in the path of movement of said first rod and adjacent the engaging end portion of each of said first and second rods when said first and second rods are in their first position, first guide means extending from substantial proximity to said planar base portion and opening into near proximity with the path of movement of said first and second rods at a first distance from the engaging end portion of said first rod and the engaging end portion of said second rod in its second position, second guide means extending from substantial proximity to said planar base portion and opening into near proximity with the path of movement of said first and second rods at a second distance from the engaging end portions of the said first and second rods between the engaging end portion of said second rod in its second position and the opening of said first guide means, first moving means for moving said first and second rods in their axial direction from said first position to said second position and back to said first position so that a first coupling component positioned in said first area of said first supporting means with its first end adjacent the engaging end portion of said first rod and its second end adjacent the engaging end portion of said second rod is carried by said first rod and is abutted by said second rod in the axial direction thereof into proximity with the opening of said first guide means when said first rod is in its second position and said second rod is in an intermediate position and a first coupling component positioned in said first area of said first supporting means with its second end adjacent the engaging end portion of said first rod and its first end adjacent the engaging end portion of said second rod is pushed by said first rod and is abutted by said second rod in the axial direction thereof into proximity with the opening of said second guide means when said first and second rods are in their second position, one of said first and second guide means being formed to convey said first coupling component to said planar base portion with said second end thereof parallel to and supported by the said planar base portion and the other of said first and second guide means being formed to convey said first coupling component to said planar base portion with said second end thereof parallel to and supported by the said planar base portion, first transporting means adapted to move said first coupling component from proximity with into said first guide means, and second transporting means adapted to move said first coupling component from proximity with into said second guide means; sleeve supply means for supplying a sleeve component to the aperture of said first coupling component on said planar base portion through the first end of the said first coupling component; second automatic positioning means for positioning a second coupling component on the first end of said first coupling component on said planar base portion with the first end of said second coupling component in coupling contact with said first end of said first coupling component, said second automatic positioning means comprising second supporting means positioned above said planar base portion, a third rod having an axis and a third engaging end portion having a diameter larger than the second inner diameter of the second end of said second coupling component and smaller than the first inner diameter of the first end of said second coupling component and adapted to move freely through said first end of said second coupling component into the aperture thereof, third mounting means slidably supporting said third rod on said second supporting means, said third rod being axially movable in said third mounting means from a first position to a maximum extended second position spaced from said first position, second supply means for supplying said second coupling component to said second supporting means in substantially coaxial relation with said third rod in a first area in the path of movement of said third rod and adjacent the third engaging end portion of said third rod when said third rod is in its first position, third guide means extending from substantial proximity to said first coupling component on said planar base portion and opening into said second supporting means in the path of movement of said third rod at a first distance from the engaging end portion of the said third rod beyond said first area of said second supporting means, fourth guide means extending from substantial proximity to said first coupling component on said planar base portion and opening into said second supporting means in the path of movement of said third rod at a second distance from the engaging end portion of said third rod beyond said first distance, catch means on said second supporting means at the edge of the opening of said fourth guide means farthest from the engaging end portion of said third rod, and second moving means for moving said third rod in its axial direction from its first position to its maximum extended second position and back to its first position so that a second coupling component positioned in said first area of said second supporting means with its second end adjacent the engaging end portion of said third rod and its first end spaced therefrom is pushed by said third rod in the axial direction thereof, said first end first into the opening of said third guide means and a second coupling component positioned in said first area of said second supporting means with its first end adjacent the engaging end portion of said third rod and with its second end spaced therefrom is carried by said third rod in the axial direction thereof to the opening of said fourth guide means and when said third rod reaches its maximum extended second position said second end of said second coupling component is engaged by said catch means and said second coupling component drops said first end first into said fourth guide means when the said third rod is moved back to its first position; clamping means for coupling said second coupling component with said first coupling component, said clamping means comprising a shaft positioned substantially perpendicularly to said planar base portion and having an axis, an upper region, a lower region, and an axial aperture in the lower region thereof, driving means for rotating said shaft about its axis, a support arm having a pair of extremities and affixed to said shaft in the lower region thereof and adapted to rotate therewith, said support arm being positioned perpendicularly to the axis of said shaft, a pair of clamping arms each being of substantially elongated configuration with a clamping end and a free opposite end, pivot means pivotally mounting one of said clamping arms at a point positioned between the ends thereof at each extremity of said support arm so that when said shaft is rotated at higher than a predetermined speed said support arm rotates therewith and said clamping arms are pivoted by centrifugal force with their clamping ends spaced a first distance from each other and with their free ends spaced a second distance smaller than said first distance from each other, a control ring slidably mounted on said shaft in substantially the upper region thereof, said control ring being held in substantially said upper region of said shaft spaced from the free ends of said clamping arms when said shaft is rotated at higher than said predetermined speed and said control ring sliding under gravitational force to a position lower than said first-mentioned position wherein the said control ring abuts the free ends of said clamping arms and urges said free ends of said clamping arms away from each other to a third distance from each other greater than each of said first and second distances so that the clamping ends of said clamping arms are urged toward each other to a fourth distance from each other smaller than each of said first, second and third distances thereby positioning said clamping ends of said clamping arms to enable the said clamping arms to clamp a second coupling component between the said clamping ends thereof and to rotate and drive the said second coupling component when, after a predetermined period of time, said shaft is rotated at lower than said predetermined speed, and directing means for positioning said second coupling component substantially coaxially with said shaft, said directing means comprising a spring-biased pin housed in the aperture of said shaft and extending from said shaft in the axial direction thereof and a substantially conical pinhead on the outermost end of said pin, said pinhead being adapted to abut the second end of said second coupling component with the apex of said pinhead adapted to be positioned in the aperture of the said second coupling component thereby to direct the said second coupling component into coaxial alignment with the said shaft; and control means for controlling said first sleeve and second supply means to control the supply of said first and second coupling components and said sleeves, for controlling said first and second moving means to control the movement of said first and second coupling components to said guide means, for controlling said first and second transporting means to control the movement of said first coupling component to said planar base portion, for moving the shaft of said clamping means into and out of a desired clamping position with relation to said planar base portion, for holding the control ring of said clamping means in substantially the upper region of the shaft of said clamping means spaced from the free ends of the clamping arms thereof, for releasing the control ring of said clamping means after said predetermined period of time and for controlling the speed of rotation of the shaft of said clamping means in correspondence with the position of said shaft in relation to said planar base portion, said control means controlling said supply means, moving means, transporting means and clamping means components in coordination thereby providing a coordinated sequence of operations including positioning said first coupling component on said planar base portion, positioning a sleeve in the aperture of said first coupling component, positioning a second coupling component on the first end of said first coupling component with the first end of said second coupling component in coupling contact with said first end of said first coupling component and coupling said first and second coupling components to each other with said sleeve in the aperture of said first coupling component.

13. Automatic positioning apparatus for positioning a coupling component having a first end having first cross-sectional dimensions and a second end opposite to said first end having second cross-sectional dimensions smaller than said first cross-sectional dimensions in a predetermined location with one of the first and second ends thereof parallel to and supported in said predetermined location, said automatic positioning apparatus comprising, in combination, first selecting means having an axis and a first engaging end portion having cross-sectional dimensions adapted to cause said first engaging end portion to abut said coupling component when the said first engaging end portion is urged toward one of said first and second ends of the said coupling component and adapted to cause said first engaging end portion to carry the said coupling component when the said first engaging end portion is urged toward the other of said first and second ends of the said coupling component, second selecting means having an axis and a second engaging end portion having cross-sectional dimensions adapted to cause said second engaging end portion to abut said coupling component when the said second engaging end portion is urged toward each of the first and second ends of said coupling component, supply means for supplying said coupling component in substantially coaxial relation with said first and second selecting means in a first area in the path of movement of said first selecting means and adjacent the engaging end portion of each of said first and second selecting means when said first and second selecting means are in a first position, first guide means extending from said predetermined location and opening into near proximity with the path of movement of said first and second selecting means at a first distance from the engaging end portion of said first selecting means and the engaging end portion of said second selecting means in a second position, second guide means extending from said predetermined location and opening into near proximity with the path of movement of said first and second selecting means at a second distance from the engaging end portions of the said first and second selecting means between the engaging end portion of said second selecting means in its second position and the opening of said first guide means, and moving means for moving said first and second selecting means in their axial direction from a first position of said first selecting means and a maximum extended first position of said second selecting means to a maximum extended second position of said first selecting means spaced from its first position and a second position of said second selecting means spaced from its first position and back to said first position so that a coupling component positioned in said first area with one of its first and second ends adjacent the engaging end portion of said first selecting means and the other of its first and second ends adjacent the engaging end portion of said second selecting means is carried by said first selecting means and is abutted by said second selecting means in the axial direction thereof into the opening of said first guide means when said first selecting means is in its second position and said second selecting means is in an intermediate position and a coupling component positioned in said first area with the other of its first and second ends adjacent the engaging end portion of said first selecting means and said one of its first and second ends adjacent the engaging end portion of said second selecting means is pushed by said first selecting means and is abutted by said second selecting means in the axial direction thereof into the opening of said second guide means when said first and second selecting means are in their second position, one of said first and second guide means being formed to convey said coupling component to said predetermined location with said one of said first and second ends thereof parallel to and supported in the said predetermined location and the other of said first and second guide means being formed to convey said coupling component to said predetermined location with the said one of said first and second ends thereof parallel to and supported in said predetermined location.

14. Automatic positioning apparatus for positioning a coupling component having a first end having first cross-sectional dimensions and a second end opposite to said first end having second cross-sectional dimensions smaller than said first cross-sectional dimensions in a predetermined location with one of the first and second ends thereof parallel to and supported in said predetermined location, said automatic positioning apparatus comprising, in combination, supporting means positioned above said predetermined location, a first rod having an axis and a first engaging end portion having cross-sectional dimensions adapted to cause said first engaging end portion to abut said coupling component when the said first engaging end portion is urged toward one of said first and second ends of the said coupling component and adapted to cause said first engaging end portion to carry the said coupling component when the said first engaging end portion is urged toward the other of said first and second ends of the said coupling component; first mounting means slidably supporting said first rod on said supporting means, said first rod being axially movable in said first mounting means from a first position to a maximum extended second position spaced from said first position; a second rod having an axis and a second engaging end portion having cross-sectional dimensions adapted to cause said second engaging end portion to abut said coupling component when the said second engaging end portion is urged toward each of the first and second ends of said coupling component; second mounting means slidably supporting said second rod coaxially with said first rod on said supporting means, said second rod being axially movable in said second mounting means from a maximum extended first position between the first position of said first rod and said second mounting means to a second position spaced from said first position between the second position of said first rod and the said second mounting means; supply means for supplying said coupling component in substantially coaxial relation with said first and second rods in a first area in the path of movement of said first rod and adjacent the engaging end portion of each of said first and second rods when said first and second rods are in their first position; first guide means extending from substantial proximity to said predetermined location and opening into near proximity with the path of movement of said first and second rods at a first distance from the engaging end portion of said first rod and the engaging end portion of said second rod in its second position; second guide means extending from substantial proximity to said predetermined location and opening into near proximity with the path of movement of said first and second rods at a second distance from the engaging end portions of the said first and second rods between the engaging end portion of said second rod in its second position and the opening of said first guide means; and moving means for moving said first and second rods in their axial direction from said first position to said second position and back to said first position so that a coupling component positioned in said first area of said supporting means with one of its first and second ends adjacent the engaging end portion of said first rod and the other of its first and second ends adjacent the engaging end portion of said second rod is carried by said first rod and is abutted by said second rod in the axial direction thereof into the opening of said first guide means when said first rod is in its second position and said second rod is in an intermediate position and a coupling component positioned in said first area of said supporting means with the other of its first and second ends adjacent the engaging end portion of said first rod and said one of its first and second ends adjacent the engaging end portion of said second rod is pushed by said first rod and is abutted by said second rod in the axial direction thereof into the opening of said second guide means, when said first and second rods are in their second position, one of said first and second guide means being formed to convey said coupling component to convey said coupling component to said predetermined location with said one of said first and second ends thereof parallel to and supported in the said predetermined location and the other of said first and second guide means being formed to convey said coupling component to said predetermined location with the said one of said first and second ends thereof parallel to and supported in the said predetermined location.

15. Automatic positioning apparatus for positioning a coupling component having a threaded axial aperture formed therethrough, a first end having a first inner diameter and a second end opposite to said first end having a second inner diameter smaller than said first inner diameter in a predetermined location with the second end thereof parallel to and supported in said predetermined location, said automatic positioning apparatus comprising, in combination, supporting means positioned above said predetermined location; a first rod having an axis and a first engaging end portion having a diameter larger than the second inner diameter of the second end of said coupling component and smaller than the first inner diameter of the first end of the said coupling component and adapted to move freely through said first end of said coupling component into the aperture thereof; first mounting means slidably supporting said first rod on said supporting means, said first rod being axially movable in said first mounting means from a first position to a maximum extended second position spaced from said first position, a second rod having an axis and a second engaging end portion having a diameter larger than the first and second inner diameters of the first and second ends of said coupling component; second mounting means slidably supporting said second rod coaxially with said first rod on said supporting means, said second rod being axially movable in said second mounting means from a maximum extended first position between the first position of said first rod and said second mounting means to a second position spaced from said first position between the second position of said first rod and the said second mounting means; supply means for supplying said coupling component in substantially coaxial relation with said first and second rods in a first area in the path of movement of said first rod and adjacent the engaging end portion of each of said first and second rods when said first and second rods are in their first position; first guide means extending from substantial proximity to said predetermined location and opening into near proximity with the path of movement of said first and second rods at a first distance from the engaging end portion of said first rod and the engaging end portion of said second rod in its second position; second guide means extending from substantial proximity to said predetermined location and opening into near proximity with the path of movement of said first and second rods at a second distance from the engaging end portions of the said first and second rods between the engaging end portion of said second rod in its second position and the opening of said first guide means; and moving means for moving said first and second rods in their axial direction from said first position to said second position and back to said first position so that a coupling component positioned in said first area of said supporting means with its first end adjacent the engaging end portion of said first rod and its second end adjacent the engaging end portion of said second rod is carried by said first rod and is abutted by said second rod in the axial direction thereof into the opening of said first guide means when said first rod is in its second position and said second rod is in an intermediate position and a coupling component positioned in said first area of said supporting means with its second end adjacent the engaging end portion of said first rod and its first end adjacent the engaging end portion of said second rod is pushed by said first rod and is abutted by said second rod in the axial direction thereof into the opening of said second guide means when said first and second rods are in their second position, one of said first and second guide means being formed to convey said coupling component to said predetermined location with said second end thereof parallel to and supported in the said predetermined location and the other of said first and second guide means being formed to convey said coupling component to said predetermined location with said second end thereof parallel to and supported by the said predetermined location.

16. Automatic positioning apparatus for positioning a coupling component having a first end having first cross-sectional dimensions and a second end opposite to said first end and having second cross-sectional dimensions smaller than said first cross-sectional dimensions in a predetermined location with one of the first and second ends of said coupling component positioned in said predetermined location with said other of said first and second ends of said coupling component spaced therefrom, said automatic positioning apparatus comprising, in combination, selecting means having an axis and an engaging end portion having cross-sectional dimensions adapted to cause said engaging end portion to abut said coupling component when said engaging end portion is urged toward one of the first and second ends of the said coupling component and adapted to cause the said engaging end portion to carry the said coupling component when the said engaging end portion is urged toward the other of the first and second ends of the said coupling component; supply means for supplying said coupling component in substantially coaxial relation with said selecting means in a first area in the path of movement of said selecting means and adjacent the engaging end portion of said selecting means when said selecting means is in a first position; first guide means extending from substantial proximity to said predetermined location and opening into the path of movement of said selecting means at a first distance from the engaging end portion of the said selecting means beyond said first area; second guide means extending from substantial proximity to said predetermined location and opening into the path of movement of said selecting means at a second distance from the engaging end portion of said selecting means beyond said first distance; catch means affixed at the edge of the opening of said second guide means farthest from the engaging end portion of said selecting means; and moving means for moving said selecting means in its axial direction from a first position to a maximum extended second position spaced from its first position and back to its first position so that a coupling component positioned in said first area with one of its first and second ends adjacent the engaging end portion of said selecting means and the other of its first and second ends spaced therefrom is pushed by said selecting means in the axial direction thereof said other end first into the opening of said first guide means and a coupling component positioned in said first area with said other of its first and second ends adjacent the engaging end portion of said selecting means and said one end spaced therefrom is carried by said selecting means in the axial direction thereof to the opening of said second guide means and when said selecting means reaches its maximum extended second position said one end of said coupling component is engaged by said catch means and said coupling component drops said other end first into said second guide means when the said selecting means is moved back to its first position.

17. Automatic positioning apparatus for positioning a coupling component having a first end having first cross-sectional dimensions and a second end opposite to said first end and having second cross-sectional dimensions smaller than said first cross-sectional dimensions in a predetermined location with one of the first and second ends of said coupling component positioned in said predetermined location and with said other of said first and second ends of said coupling component spaced therefrom, said automatic positioning apparatus comprising supporting means positioned above said predetermined location; a rod having an axis and an engaging end portion having cross-sectional dimensions adapted to cause said engaging end portion to abut said coupling component when said engaging end portion is urged toward one of the first and second ends of the said coupling component and adapted to cause the said engaging end portion to carry the said coupling component when the said engaging end portion is urged toward the other of the first and second ends of the said coupling component; mounting means slidably supporting said rod on said supporting means, said rod being axially movable in said mounting means from a first position to a maximum extended second position spaced from said first position; supply means for suplying said coupling component to said supporting means in substantially coaxial relation with said rod in a first area in the path of movement of said rod and adjacent the engaging end portion of said rod when said rod is in its first position; first guide means extending from substantial proximity to said predetermined location and opening into said supporting means in the path of movement of said rod at a first distance from the engaging end portion of the said rod beyond said first area of said supporting means; second guide means extending from substantial proximity to said predetermined position and opening into said supporting means in the path of movement of said rod at a second distance from the engaging end portion of said rod beyond said first distance; catch means on said supporting means at the edge of the opening of said second guide means farthest from the engaging end portion of said rod; and moving means for moving said rod in its axial direction from its first position to its maximum extended second position and back to its first position so that a coupling component positioned in said first area of said supporting means with one of its first and second ends adjacent the engaging end portion of said rod and the other of its first and second ends spaced therefrom is pushed by said rod in the axial direction thereof said other end first into the opening of said first guide means and a coupling component positioned in said first area of said supporting means with said other of its first and second ends adjacent the engaging end portion of said rod and said one end spaced therefrom is carried by said rod in the axial direction thereof to the opening of said second guide means and when said rod reaches its maximum extended second position said one end of said coupling component is engaged by said catch means and said coupling component drops said other end first into said second guide means when the said rod is moved back to its first position.

18. Automatic positioning apparatus for positioning a coupling component having a threaded axial aperture formed therethrough, a first threaded end having a first outer diameter and a first inner diameter and a second threaded end opposite to said first end and having a second outer diameter smaller than the first outer diameter of said first end and a second inner diameter smaller than the first inner diameter of said first end in a predetermined location on a planar base portion with the first end of said coupling component in said predetermined location and with the second end of said coupling component spaced therefrom, said automatic positioning apparatus comprising, in combination, supporting means positioned above said predetermined location; a rod having an axis and an engaging end portion having a diameter larger than the second inner diameter of the second end of said coupling component and smaller than the first inner diameter of the first end of said coupling component and adapted to move freely through said first end of said coupling component into the aperture thereof; mounting means slidably supporting said rod on said supporting means, said rod being axially movable in said mounting means from a first position to a maximum extended second position spaced from said first position; supply means for supplying said coupling component to said supporting means in substantially coaxial relation with said rod in a first area in the path of movement of said rod and adjacent the engaging end portion of said rod when said rod is in its first position; first guide means extending from substantial proximity to said predetermined location and opening into said supporting means in the path of movement of said rod at a first distance from the engaging end portion of the said rod beyond said first area of said supporting means; second guide means extending from substantial proximity to said predetermined location and opening into said supporting means in the path of movement of said rod at a second distance from the engaging end portion of said rod beyond said first distance; catch means on said supporting means at the edge of the opening of said second guide means farthest from the engaging end portion of said rod; and moving means for moving said rod in its axial direction from its first position to its maximum extended second position and back to its first position so that a coupling component positioned in said first area of said supporting means with its second end adjacent the engaging end portion of said rod and its first end spaced therefrom is pushed by said rod in the axial direction thereof said first end first into the opening of said first guide means and a coupling component positioned in said first area of said supporting means with its first end adjacent the engaging end portion of said rod and with its second end spaced therefrom is carried by said rod in the axial direction thereof to the opening of said second guide means and when said rod reaches its maximum extended second position said second end of said coupling component is engaged by said catch means and said coupling component drops said first end into said second guide means when the said rod is moved back to its first position.

19. An automatic clamping device for clamping, rotating and driving a coupling component comprising, in combination, a pair of clamping means and clamping control means for positioning said clamping means in spaced relation from each other a first distance apart under the control of centrifugal force and for positioning said clamping means in spaced relation from each other a smaller second distance apart under the control of gravitational force, said clamping means at said second distance from each other being enabled to clamp a coupling component between them and to rotate and drive said coupling component.

20. An automatic clamping device for clamping, rotating and driving a coupling component having an axial aperture formed therethrough and opposite ends, comprising, in combination, a substantially vertically positioned shaft having an axis, an upper region, a lower region and an axial aperture in the lower region thereof; driving means for rotating said shaft about its axis; a support arm having a pair of extremities and affixed to said shaft in the lower region thereof and adapted to rotate therewith, said support arm being positioned perpendicularly to the axis of said shaft; a pair of clamping arms each being of substantially elongated configuration with a clamping end and a free opposite end; pivot means pivotally mounting one of said clamping arms at a point positioned between the ends thereof at each extremity of said support arm so that when said shaft is rotated at higher than a predetermined speed said support arm rotates therewith and said clamping arms are pivoted by centrifugal force with their clamping ends spaced a first distance from each other and with their free ends spaced a second distance smaller than said first distance from each other; a control ring slidably mounted on said shaft in substantially the upper region thereof, said control ring being held in substantially said upper region of said shaft spaced from the free ends of said clamping arms when said shaft is rotated at higher than said predetermined speed and said control ring sliding under gravitational force to a position lower than said first-mentioned position wherein the said control ring abuts the free ends of said clamping arms and urges said free ends of said clamping arms away from each other to a third distance from each other greater than each of said first and second distances so that the clamping ends of said clamping arms are urged toward each other to a fourth distance from each other smaller than each of said first, second and third distances thereby positioning said clamping ends of said clamping arms to enable the said clamping arms to clamp a coupling component between the said clamping ends thereof and to rotate and drive the said coupling component when, after a predetermined period of time, said shaft is rotated at lower than said predetermined speed; directing means for positioning said coupling component substantially coaxially with said shaft, said directing means comprising a spring-biased pin housed in the aperture of said shaft and extending from said shaft in the axial direction thereof and a substantially conical pinhead on the outermost end of said pin, said pinhead being adapted to abut an end of said coupling component with the apex of said pinhead adapted to be positioned in said axial aperture of the said coupling component thereby to direct the said coupling component into coaxial alignment with the said shaft; and clamping control means for moving said shaft into and out of a desired clamping position with relation to said planar base portion, for holding said control ring in substantially said upper region of said shaft spaced from the free ends of said clamping arms, for releasing said control ring after said first predetermined period of time and for controlling the speed of rotation of said shaft in correspondence with the position of the said shaft in relation to said planar base portion.

21. A process for automatically positioning a coupling component having a first end having first cross-sectional dimensions and a second end opposite to said first end having second cross-sectional dimensions smaller than said first cross-sectional dimensions in a predetermined location with one of the first and second ends thereof parallel to and supported in said predetermined location, comprising the steps of positioning a coupling component in the paths of a pair of movable selecting members; abutting with said selecting members both the first and second ends of said coupling component when one of said first and second ends thereof is at a first point; carrying on one of said selecting members said coupling component at the other of the first and second ends thereof when said other of said first and second ends thereof is at said first point; carrying on one of said selecting members said coupling component to a first position; pushing with one of said selecting members said coupling component to a second position; guiding a coupling component from said first position to said predetermined location with said one of the first and second ends thereof parallel to and supported in said predetermined location; and guiding a coupling component from said second position to said predetermined location with said one of said first and second ends thereof parallel to and supported in said predetermined location.

22. A process for automatically positioning a coupling component having a first end having first cross-sectional dimensions and a second end opposite to said first end having second cross-sectional dimensions smaller than said first cross-sectional dimensions in a predetermined location with one of the first and second ends thereof in said predetermined location and the other of said first and second ends spaced therefrom, comprising the steps of abutting the other of the ends of said coupling component when said other of said first and second ends thereof is at a first point; carrying said coupling component at the one of the first and second ends thereof when said one of said first and second ends thereof is at said first point; pushing said coupling component to a first position; carrying said coupling component to a second position; guiding said coupling component from said first position to said predetermined location with said one of the first and second ends thereof in said predetermined location and the other of said first and second ends thereof spaced therefrom; and guiding said coupling component from said second position to said predetermined location with said one of the first and second ends thereof in said predetermined location and the other of said first and second ends thereof spaced therefrom.

23. Automatic coupling apparatus for coupling a first coupling component having a first end having first cross-sectional dimensions and a second end having second cross-sectional dimensions smaller than said first cross-sectional dimensions, said second end being opposite to said first end, to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location, said first automatic positioning means comprising first selecting means for moving a first coupling component positioned with one of its first and second ends adjacent a predetermined point and the other of its first and second ends spaced from said predetermined point in a predetermined direction to a first distance from said predetermined point and for moving a first coupling component positioned with the other of its first and second ends adjacent said predetermined point and the one of its first and second ends spaced from said predetermined point in said predetermined direction to a second distance from said predetermined point, and guide means extending from said first and second distances to said predetermined location for conveying said first coupling component from each of said first and second distances to said predetermined location with said one of said first and second ends thereof parallel to and supported in the said predetermined location; second automatic positioning means for positioning a second coupling component on the other of the first and second ends of said first coupling component in said predetermined location with one of the first and second ends of said second coupling component in coupling contact with said other of said first and second ends of said first coupling component; and clamping means for automatically coupling said first and second coupling components.

24. Automatic coupling apparatus for coupling a first coupling component having a first end having first cross-sectional dimensions and a second end opposite to said first end having second cross-sectional dimensions smaller than said first cross-sectional dimensions to a second coupling component having a first end having first cross-sectional dimensions and a second end opposite to said first end and having second cross-sectional dimensions smaller than said last-mentioned first cross-sectional dimensions, comprising, in combination, first automatic positioning means for positioning a first coupling component in a predetermined location with one of the first and second ends thereof parallel to and supported in said predetermined location; second automatic positioning means for positioning a second coupling component on the other of the first and second ends of said first coupling component in said predetermined location with one of the first and second ends of said second coupling component in coupling contact with said other of said first and second ends of said first coupling component, said second automatic positioning means comprising selecting means for moving a second coupling component positioned with one of its first and second ends adjacent a predetermined point and the other of its first and second ends spaced from said predetermined point in a predetermined direction into an opening at a first distance from said predetermined point with said other end going into said opening before said one end thereof and for moving a second coupling component positioned with the other of its first and second ends adjacent said predetermined point and the one of its first and second ends spaced from said predetermined point in said predetermined direction into an opening at a second distance from said predetermined point with said other end going into said last-mentioned opening before said one end thereof, and guide means extending from said openings to said predetermined location for conveying said second coupling component from each of said openings to said first coupling component in said predetermined location with said other of said first and second ends thereof in contact with said first coupling component; and clamping means for coupling said second coupling component with said first coupling component.

25. An automatic clamping device for clamping, rotating and driving a coupling component comprising, in combination, a pair of clamping means and clamping control means for opening said clamping means relatively to each other under the control of centrifugal force and for closing said clamping means relatively to each other under the control of gravitational force, said clamping means when closed relatively to each other being enabled to clamp a coupling component between them and to rotate and drive said coupling component.

26. An automatic clamping device for clamping, rotating and driving a coupling component comprising, in combination, a pair of clamping means and clamping control means including a control member slidably mounted in relation to said clamping means in a manner such that said control member is maintained in spaced relation from said clamping means under the control of centrifgual force and permtis said clamping means to open relatively to each other under the control of centrifugal force and the said control member is maintained in contact with said clamping means under the control of gravitational force and thereby urges said clamping means to close relatively to each other under the control of gravitational force, said clamping means when closed relatively to each other being enabled to clamp a coupling component between them and to rotate and drive said coupling component.

27. An automatic clamping device for clamping, rotating and driving a coupling component comprising, in combination, a pair of clamping means mounted for centrifugal motion on a rotatable shaft and clamping control means including a control member slidably mounted on said shaft in relation to said clamping means in a manner such that said control member is maintained in spaced relation from said clamping means under the control of centrifugal force when said shaft is rotated at higher than a predetermined speed and permits said clamping means to open relatively to each other under the control of centrifugal force and the said control member is maintained in contact with said clamping means under the control of gravitational force when said shaft is rotated at lower than said predetermined speed and thereby urges said clamping means to close relatively to each other under the control of gravitational force, said clamping means when closed relatively to each other being enabled to clamp a coupling component between them and to rotate and drive said coupling component.

References Cited in the file of this patent
UNITED STATES PATENTS

| | | |
|---|---|---|
| 1,990,525 | Chancellor | Feb. 12, 1935 |
| 2,639,497 | Stouffer | May 26, 1953 |
| 2,756,490 | Sawdey | July 31, 1956 |
| 2,943,335 | Daniel | July 5, 1960 |